United States Patent [19]

Takedoi et al.

[11] Patent Number: 5,314,750
[45] Date of Patent: May 24, 1994

[54] MAGNETIC IRON OXIDE PARTICLES AND METHOD OF PRODUCING SAME

[75] Inventors: Atsushi Takedoi; Mamoru Tanihara; Tosiharu Harada; Masaru Isoai; Kazuhiro Fujita, all of Hiroshima, Japan

[73] Assignee: Toda Kogyo Corp., Hiroshima, Japan

[21] Appl. No.: 967,522

[22] Filed: Oct. 27, 1992

Related U.S. Application Data

[63] Continuation of Ser. No. 342,152, Apr. 24, 1989, abandoned.

[30] Foreign Application Priority Data

Dec. 29, 1988 [JP] Japan ................. 63-333108
Dec. 29, 1988 [JP] Japan ................. 63-333109
Feb. 27, 1989 [JP] Japan ................. 1-48028
Feb. 27, 1989 [JP] Japan ................. 48029

[51] Int. Cl.$^5$ .................. C01G 49/02; H01F 1/06
[52] U.S. Cl. .................. 428/402; 352/62.56; 423/632; 423/633; 428/403; 428/900
[58] Field of Search ........ 428/402, 403, 900; 252/62.55, 62.56; 427/622, 632, 633

[56] References Cited

U.S. PATENT DOCUMENTS

| | | | |
|---|---|---|---|
| 3,720,618 | 3/1973 | Toda et al. | 252/62.56 |
| 3,977,985 | 8/1976 | Umeki et al. | 252/62.55 |
| 4,033,891 | 7/1977 | Matsui et al. | 252/62.56 |
| 4,108,787 | 8/1978 | Masaki et al. | 252/62.56 |
| 4,136,158 | 1/1979 | Okuda et al. | 423/632 |
| 4,226,909 | 10/1980 | Kanten | 428/329 |
| 4,376,714 | 3/1983 | Pingaud | 252/62.56 |
| 4,465,735 | 8/1984 | Togawa et al. | 428/329 |
| 4,495,164 | 1/1985 | Okuda et al. | 423/266 |
| 4,773,931 | 9/1988 | Mishima et al. | 75/251 |
| 4,842,759 | 6/1989 | Okamura et al. | 252/62.51 |
| 4,873,010 | 10/1989 | Takedoi et al. | 252/62.59 |

FOREIGN PATENT DOCUMENTS 0123318 10/1984 European Pat. Off. .
0160496 11/1985 European Pat. Off. .
50-80999 7/1975 Japan .

Primary Examiner—George F. Lesmes
Assistant Examiner—Christopher Brown
Attorney, Agent, or Firm—Nixon & Vanderhye

[57] ABSTRACT

Disclosed herein are magnetic iron oxide particles which have a spindle shape and a substantially uniform particle size and shape, and are substantially free of dendrites and have a large axial ratio (major axial diameter/minor axial diameter) and an excellent print-through characteristic, and a method of producing the same.

8 Claims, 13 Drawing Sheets

MAGNETIC IRON OXIDE PARTICLES AND METHOD OF PRODUCING SAME

This is a continuation of application Ser. No. 07/342,152, filed Apr. 24, 1989, now abandoned.

BACKGROUND OF THE INVENTION

The present invention relates to magnetic iron oxide particles which have a spindle shape and a substantially uniform particle size and shape, and are substantially free of dendrites and have a large axial ratio (major axial diameter/minor axial diameter) and an excellent print-through characteristic, and a method of producing the same.

The particles of the present invention are magnetic iron oxide particles having a spindle particle-shape, and a substantially uniform particle size and shape, and being substantially free of dendrites. These particles will be referred to simply as "spindle-shaped magnetic iron oxide particles" hereinunder.

With the development of a smaller-sized and lighter-weight magnetic recording apparatuses, the necessity for a recording medium having a higher performance such as a magnetic tape and a magnetic disk has been increasing more and more.

In other words, a magnetic recording medium is required to have a high recording density, a high sensitivity and a high output characteristics.

The properties in which magnetic iron oxide particles are required to have in order to satisfy the said demands on a magnetic recording medium are a small particle size, a high coercive force and an excellent dispersibility.

To state this more concretely, it is necessary that magnetic iron oxide particles have as high coercive force as possible in order to provide a magnetic recording medium with a high recording density, a high sensitibity and a high output. This fact is obvious from, for example, the descriptions: "Since the improvement of magnetic tapes has been directed toward a high sensitivity and a high output, emphasis has been laid on enhancing the coercive force of acicular $\gamma\text{-Fe}_2\text{O}_3$ particles, ..." on page 310 of DEVELOPMENT OF MAGNETIC MATERIAL AND TECHNOLOGY OF IMPROVING DISPERSIBILITY OF MAGNETIC POWDER (1982), published by K. K. Sogo Gijutsu Center, and "It is known that there is a relationship between the particle size of acicular $\gamma\text{-Fe}_2\text{O}_3$ and the noise of a magnetic recording tape, and if the particle size become finer, the noise of magnetic recording tape lower" on page 312 of the same publication.

DEVELOPMENT OF MAGNETIC MATERIAL AND TECHNOLOGY OF IMPROVING DISPERSIBILITY OF MAGNETIC POWDER also discloses on page 312 The condition for high-density recording in a coating type tape is that the tape is capable of maintaining high output characteristics with a low noise with respect to a short-wave signal. To satisfy this condition, it is necessary that the magnetic recording medium has both high coercive force (Hc) and large residual magnetization (Br), and a thin coated film. As seen from the above, it is really necessary that the magnetic recording medium has both high coercive force (Hc) and large residual magnetization (Br) in order to obtain a high recording density and to satisfy these conditions, and accordingly the magnetic iron oxide particles are required to have a high coercive force, an excellent dispersibility in the vehicle and a high orientation and a high packing density in the coated film.

The residula magnetization (Br) in a magnetic recording medium depends upon the dispersibility of the magnetic iron oxide particles in the vehicle and the orientation and packing density of the magnetic iron oxide particles in the coated film, and in order to improve these properties, the magnetic iron oxide particles dispersed in the vehicle are required to have as large an axial ratio (major axial diameter/minor axial diameter) as possible, a uniform particle size and no inclusion of dendrites.

As well known, the magnitude of the coercive force of magnetic iron oxide particles depend upon the configurational anisotropy, crystalline anisotropy, strain anisotropy, exchange anisotropy, or the interaction thereof.

Acicular magnetite particles and acicular maghemite particles which are used as magnetic iron oxide particles at present produce a relatively high coercive force by utilizing the anisotropy derived from their shapes, namely, by increasing the axial ratio (major axial diameter/minor axial diameter).

The known acicular magnetite particles are obtained by reducing the starting material goethite particles at 250° to 400° C. in a reducing gas such as hydrogen, and the known acicular maghemite particles are obtained by further oxidizing the thus-obtained magnetite particles at 200° to 300° C. in air.

As described above, magnetic iron oxide particles which have a substantially uniform particle size, are substantially free of dendrites, and have a large axial ratio (major axial diameter/minor axial diameter) are now in the strongest demand. In order to obtain magnetic iron oxide particles provided with these properties, it is necessary that the starting material goethite particles have a substantially uniform particle size, are substantially free of dendrites and have a large axial ratio (major axial diameter/minor axial diameter).

As a method of producing goethite particles, which are the starting material, a method of producing acicular goethite particles by oxidizing a solution containing ferrous hydroxide particles which is obtained by adding more than an equivalent of an alkaline solution to a ferrous salt solution, the oxidation being carried out by blowing an oxygen-containing gas into the solution containing ferrous hydroxide particles at not higher than 80° C. at pH of not less than 11 [Japanese Patent Publication No. 39-5610 (1964)], a method of producing spindle-shaped goethite particles by oxidizing an aqueous solution containing $FeCO_3$ which is obtained by reacting an aqueous ferrous salt solution with an alkali carbonate, the oxidation being carried out by blowing an oxygen-containing gas into the aqueous solution containing $FeCO_3$ [Japanese Patent Application Laid-Open (KOKAI) No. 50-80999 (1975)], and the like are conventionally known.

As the magnetic iron oxide particles having a high coercive force, the so-called Co-doped magnetic iron oxide particles and the so-called Co-coated magnetic iron oxide particles are conventionally known. The coercive force of these magnetic iron oxide particles are apt to be increased with the increase in the Co content. The Co-doped magnetic iron oxide particles are obtained by producing Co-containing goethite particles by adding a Co salt when the starting material goethite particles are produced, and reducing the thus-obtained Co-containing goethite particles to produce Co-containing magnetite particles or further oxidizing the magnetite particles, if necessary, to produce Co-containing maghemite particles. The Co-coated magnetic iron oxide particles are obtained by using the magnetite particles or maghemite particles obtained by reducing or further oxidizing, if necessary, the starting material goethite particles as a precursor and coating the surfaces of the precursor particles with a Co compound.

The Co-doped magnetic iron oxide particles have a high coercive force, but they are disadvantageous in that since Co diffuses in the crystals, the distribution of the coercive force is enlarged, thereby making the magnetic iron oxide particles thermally and temporally unstable. In contrast, the Co-coated magnetic iron oxide particles are thermally and temporally stable.

There is no end to the recent demand for the improvement of the properties of magnetic iron oxide particles. In addition to uniform particle size, absence of dendrites, high coercive force, thermal and temporal stability and large axial ratio, (major axial diameter/minor axial diameter), the improvement of the capacity of transferring a recording signal to the opposing magnetic layer, the so-called a print-through characteristic is strongly demanded.

The print-through characteristic has a tendency to be deteriorated as the magnetic iron oxide particles become finer, especially, when the particle size is not more than 0.3 μm. As to this tendency, ELECTRONIC TECHNIQUE (1968), vol. 10, published by Nikkan Kogyo Shimbun, discloses on page 51 "... it is known that the transferring effect has an unfavorable tendency to be deteriorated in proportion to the lowering of a noise level due to the reduction in the particle size . . . ". This tendency is a serious problem in the present when the finer and finer magnetic iron oxide particles are apt to be used with the demand for a high recording density, a high sensitivity and a high output characteristic.

In addition, in order to improve the print-through characteristic of the Co-coated magnetic iron oxide particles, it is necessary that the particle size distribution of the precursor particles is as uniform as possible and the axial ratio (major axial diameter/minor axial diameter) is as large as possible. To satisfy these conditions, the starting material goethite particles are also required to have as uniform particle size distribution as possible and as large an axial ratio (major axial diameter/minor axial diameter) as possible.

Furthermore, demand for abbreviation in resources and energy used has become increasingly stronger, and it is also demanded that magnetic iron oxide particles be industrially and economically advantageously produced.

As described above, magnetic iron oxide particles which have fine and uniform particle size, no inclusion of dendrites, thermal stability independent to change with time, a large axial ratio (major axial diameter/minor axial diameter) and an excellent print-through characteristic are now in the strongest demand. If the method disclosed in Japanese Patent Publication No. 39-5610 (1964) is adopted for producing the starting material goethite particles, acicular goethite particles having a large axial ratio (major axial diameter/minor axial diameter), particularly, not less than 10 are produced, but dendrites are included therein. As to the particle size, they cannot be said to be the particles having a uniform particle size, and the print-through characteristic of the magnetic iron oxide particles obtained by using these goethite particles are unsatisfactory.

On the other hand, if the method disclosed in Japanese Patent Application Laid-Open (KOKAI) No. 50-80999 (1975) is adopted for producing the starting material goethite particles, spindle-shaped particles having a uniform particle size and including no dendrites are produced. However, the axial ratio (major axial diameter/minor axial diameter) is at most about 7, in other words, the production of particles having a large axial ratio (major axial diameter/minor axial diameter) are difficult, and this phenomenon becomes prominent as the major axis diameter of the particles produced is reduced. The print-through characteristic of the magnetic iron oxide particles and Co-coated magnetic iron oxide particles obtained by using these goethite particles are unsatisfactory.

Various attempts have conventionally been carried out to increase the axial ratio (major axial diameter/minor axial diameter) of spindle-shaped goethite particles. For example, there is a method of reducing the gas flow velocity at which an oxygen-containing gas is blown into a suspension containing $FeCO_3$ which is obtained by reacting an aqueous ferrous salt solution with an aqueous alkali carbonate to about 0.1 to 2.0 cm/sec, as disclosed in [Japanese Patent Application Laid-Open (KOKAI) No. 59-232922 (1984)]. According to this method, when the major axis is about 0.5 μm, the axial ratio (major axial diameter/minor axial diameter) is about 10; when the major axis is about 0.3 μm, the axial ratio (major axial diameter/minor axial diameter) is about 8; and when the major axis is as small as about 0.05 μm, the axial ratio (major axial diameter/minor axial diameter) also becomes as small as about 5. The axial ratio (major axial diameter/minor axial diameter) cannot therefore be said to be sufficiently large.

In the example in the Japanese Patent Application Laid-Open (KOKAI) No. 62-158801 (1987), spindle-shaped goethite particles having an axial ratio (major axial diameter/minor axial diameter) of 10 are obtained. These particles, however, are obtained by making the concentration of iron as low as about 0.2 mol/l, and the axial ratio (major axial diameter/minor axial diameter) cannot be said to be sufficiently large, either.

Also, spindle-shaped magnetic iron oxide particles are disclosed in European Patent No. 160,496.

For these reasons, means for obtaining spindle-shaped magnetic iron oxide particles or Co-coated magnetic iron oxide particles which have a substantially uniform particle size, are substantially free of dendrites, and have a large axial ratio (major axial diameter/minor axial diameter) and an excellent print-through characteristic is now strongly demanded.

The present inventor made various researches so as to obtain spindle-shaped magnetic iron oxide particles or Co-coated magnetic iron oxide particles which have a substantially uniform particle size and shape, are substantially free of dendrites, and have a large axial ratio (major axial diameter/minor axial diameter) and an excellent print-through characteristic. As a result, it has been found that (1) spindle-shaped goethite are produced by aging at a temperature of 40° to 60° C. for 50 to 100 minutes an aqueous solution containing $FeCO_3$ which is obtained by reacting an aqueous alkali carbonate with an aqueous ferrous salt solution in a non-oxidizing atmosphere, the amount of aqueous alkali carbonate being 1.5 to 3.5 times the equivalent based on $Fe^{2+}$ in the aqueous ferrous salt solution, and blowing an oxygen-containing gas into the suspension containing FeCO$_3$ for oxidation, and the thus-obtained spindle-shaped goethite particles or hematite particles obtained by baking these goethite particles are then reduced under heating in a reducing gas, or further oxidized, if necessary, thereby obtaining magnetic iron oxide particles of spindle-shaped magnetite (FeOx.Fe$_2$O$_3$, $0 < x \leq 1$) particles having a print-through characteristic of not less than 45 dB or spindle-shaped maghemite particles having a print-through characteristic of not less than 53 dB, both of which have a major diameter of 0.1 to 0.3 μm and an axial ratio (major axial diameter/minor axial diameter) of not less than 7; (2) spindle-shaped goethite particles containing zinc are produced by adding a zinc compound in advance to any of the aqueous alkali carbonate, the aqueous ferrous salt solution, the suspension containing FeCO$_3$ and the suspension containing FeCO$_3$ in the course of aging prior to the oxidation step of blowing the oxygen-containing gas thereinto, and the thus-obtained zinc-containing goethite particles or hematite particles obtained by baking these goethite particles are reduced under heating in a reducing gas, or further oxidized, if necessary, thereby obtaining spindle-shaped zinc-containing magnetite particles having a print-through characteristic of not less than 45 dB or spindle-shaped zinc-containing maghemite particles having a print-through characteristic of not less than 53 dB, both of which have a major diameter of 0.1 to 0.3 μm and an axial (major axial diameter/minor axial diameter) of not less than 8; (3) a mixed dispersion obtained by mixing an aqueous dispersion of the thus-obtained spindle-shaped maghemite containing or not containing zinc with at least an aqueous Co salt solution and an aqueous alkaline solution and having a pH of not less than 11 is heated at a temperature of 50° to 100° C., thereby obtaining spindle-shaped magnetic iron oxide particles with the surfaces thereof modified by 0.5 to 15.0 atomic% of Co based on Fe and Co; and (4) 1 to 50% of an aqueous alkali hydroxide based on the aqueous alkali carbonate is added to any of the aqueous alkali carbonate, the suspension containing FeCO$_3$ and the suspension containing FeCO$_3$ in the course of aging prior to the oxidation step of blowing the oxygen-containing gas thereinto so that the total amount of aqueous alkali carbonate and aqueous alkali hydroxide becomes 1.1 to 2.5 times the equivalent based on Fe$^{2+}$ in the aqueous ferrous salt solution and the aging is carried out at a temperature of 30° to 60° C. for 10 to 100 minutes to produce spindle-shaped goethite particles, and the thus-obtained goethite particles or hematite particles obtained by baking these goethite particles are reduced under heating in a reducing gas, or further oxidizing the product, if necessary, thereby obtaining spindle-shaped magnetic iron oxide particles.

The present invention has been achieved on the basis of these findings.

SUMMARY OF THE INVENTION

In a 1st aspect of the present invention, there are provided spindle-shaped magnetic iron oxide particles comprising spindle-shaped magnetite (FeOx.Fe$_2$O$_3$, $0 < x \leq 1$) particles having a major axial diameter of 0.1 to 0.3 μm, an axial ratio (major axial diameter/minor axial diameter) of not less than 7 and a print-through characteristic of not less than 45 dB.

In a 2nd aspect of the present invention, there are provided spindle-shaped magnetic iron oxide particles comprising spindle-shaped magnetite (FeOx.Fe$_2$O$_3$, $0 < x \leq 1$) particles containing zinc and having a major axial diameter of 0.1 to 0.3 μm, an axial ratio (major axial diameter/minor axial diameter) of not less than 8 and a print-through characteristic of not less than 45 dB.

In a 3rd aspect of the present invention, there are provided spindle-shaped magnetic iron oxide particles comprising spindle-shaped maghemite particles having a major axial diameter of 0.1 to 0.3 μm, an axial ratio (major axial diameter/minor axial diameter) of not less than 7 and a print-through characteristic of not less than 53 dB.

In a 4th aspect of the present invention, there are provided spindle-shaped magnetic iron oxide particles comprising spindle-shaped maghemite particles containing zinc and having a major axial diameter of 0.1 to 0.3 μm, an axial ratio (major axial diameter/minor axial diameter) of not less than 8 and a print-through characteristic of not less than 53 dB.

In a 5th aspect of the present invention, there are provided spindle-shaped magnetic iron oxide particles comprising spindle-shaped magnetite (FeOx.Fe$_2$O$_3$, $0 < x \leq 1$) particles with the surfaces modified by 0.5 to 15.0 atomic% of Co based on Fe and Co, said magnetic iron oxide particles having a major axial diameter of 0.1 to 0.3 μm, an axial ratio (major axial diameter/minor axial diameter) of not less than 7, a coercive force of 480 to 1000 Oe and a print-through characteristic of not less than 52 dB.

In a 6th aspect of the present invention, there are provided spindle-shaped magnetic iron oxide particles comprising spindle-shaped magnetite (FeOx.Fe$_2$O$_3$, $0 < x \leq 1$) particles containing zinc with the surfaces modified by 0.5 to 15.0 atomic% of Co based on Fe and Co, said magnetic iron oxide particles having a major axial diameter of 0.1 to 0.3 μm, an axial ratio (major axial diameter/minor axial diameter) of not less than 8, a coercive force of 480 to 1000 Oe and a print-through characteristic of not less than 52 dB.

In a 7th aspect of the present invention, there are provided spindle-shaped magnetic iron oxide particles comprising spindle-shaped maghemite particles with the surfaces modified by 0.5 to 15.0 atomic% of Co based on Fe and Co, said magnetic iron oxide particles having a major axial diameter of 0.1 to 0.3 μm, an axial ratio (major axial diameter/minor axial diameter) of not less than 7, a coercive force of 480 to 1000 Oe and a print-through characteristic of not less than 57.0 dB.

In an 8th aspect of the present invention, there are provided spindle-shaped magnetic iron oxide particles comprising spindle-shaped maghemite particles containing zinc with the surfaces modified by 0.5 to 15.0 atomic% of Co based on Fe and Co, said magnetic iron oxide particles having a major axial diameter of 0.1 to 0.3 μm, an axial ratio (major axial diameter/minor axial diameter) of not less than 8, a coercive force of 480 to 1000 Oe and a print-through characteristic of not less than 57.0 dB.

In a 9th aspect of the present invention, there is provided a process for producing spindle-shaped magnetic iron oxide particles comprising the stpes of:

aging an aqueous solution containing FeCO$_3$ obtained by reacting an aqueous alkali carbonate with an aqueous ferrous salt solution in a non-oxidizing atmosphere at a temperature of 40° to 60° C. for 50 to 100 minutes, the amount of aqueous alkali carbonate being 1.5 to 3.5 times equivalent based on Fe$^{2+}$ in said aqueous ferrous salt solution;

blowing an oxygen-containing gas into the suspension containing said $FeCO_3$ for oxidation to produce spindle-shaped goethite particles; and reducing said spindle-shaped goethite particles or spindle-shaped hematite particles obtained by baking said spindle-shaped goethite particles under heating in a reducing gas, thereby obtaining spindle-shaped magnetite ($FeOx.Fe_2O_3$, $0<x\leq 1$) particles of the 1st aspect.

In a 10th aspect of the present invention, there is provided a process for producing spindle-shaped magnetic iron oxide particles comprising the steps of:

aging a suspension containing $FeCO_3$ obtained by reacting an aqueous alkali carbonate with an aqueous ferrous salt solution in a non-oxidizing atmosphere at a temperature of 40° to 60° C. for 50 to 100 nimutes, the amount of aqueous alkali carbonate being 1.5 to 3.5 times equivalent based on $Fe^{2+}$ in said aqueous ferrous salt solution, and blowing an oxygen-containing gas into said suspension containing said $FeCO_3$ for oxidation, wherein a zinc compound is added to a solution of said aqueous alkali carbonate, said aqueous ferrous salt solution, said suspension containing $FeCO_3$ or said suspension containing $FeCO_3$ in the course of aging prior to the oxidation step of blowing said oxygen-containing gas thereinto, thereby obtaining spindle-shaped goethite particles containing zinc; and reducing said spindle-shaped goethite particles containing zinc or spindle-shaped hematite particles containing zinc obtained by baking said spindle-shaped goethite particles containing zinc under heating in a reducing gas, thereby obtaining spindle-shaped magnetite ($FeOx.Fe_2O_3$, $0<x\leq 1$) particles containing zinc of the 2nd aspect.

In an 11th aspect of the present invention, there is provided a process for producing spindle-shaped magnetic iron oxide particles comprising the steps of:

aging a suspension containing $FeCO_3$ obtained by reacting an aqueous alkali carbonate with an aqueous ferrous salt solution in a non-oxidizing atmosphere at a temperature of 40° to 60° C. for 50 to 100 minutes, the amount of aqueous alkali carbonate being 1.5 to 3.5 times equivalent based on $Fe^{2+}$ in said aqueous ferrous salt solution;

blowing an oxygen-containing gas into said suspension containing said $FeCO_3$ for oxidation to produce spindle-shaped goethite particles;

reducing said spindle-shaped goethite particles or spindle-shaped hematite particles obtained by baking said spindle-shaped goethite particles under heating in a reducing gas to produce spindle-shaped magnetite ($FeOx.Fe_2O_3$, $0<x\leq 1$) particles; and oxidizing said spindle-shaped magnetite particles, thereby obtaining spindle-shaped maghemite particles of the 3rd aspect.

In a 12th aspect of the present invention, there is provided a process for producing spindle-shaped magnetic iron oxide particles comprising the steps of:

aging a suspension containing $FeCO_3$ obtained by reacting an aqueous alkali carbonate with an aqueous ferrous salt solution in a non-oxidizing atmosphere at a temperature of 40° to 60° C. for 50 to 100 minutes, the amount of aqueous alkali carbonate being 1.5 to 3.5 times equivalent based on $Fe^{2+}$ in said aqueous ferrous salt solution, and blowing an oxygen-containing gas into said suspension containing said $FeCO_3$ for oxidation, wherein a zinc compound is added to a solution of said aqueous alkali carbonate, said aqueous ferrous salt solution, said suspension containing $FeCO_3$ or said suspension containing $FeCO_3$ in the course of aging prior to the oxidation step of blowing said oxygen-containing gas thereinto, thereby obtaining spindle-shaped goethite particles containing zinc;

reducing said spindle-shaped goethite particles containing zinc or spindle-shaped hematite particles containing zinc obtained by baking said spindle-shaped goethite particles containing zinc under heating in a reducing gas to produce spindle-shaped magnetite ($FeOx.Fe_2O_3$, $0<x\leq 1$) particles; and oxidizing said spindle-shaped magnetite particles, thereby obtaining spindle-shaped maghemite particles containing zinc of the 4th aspect.

In a 13th aspect of the present invention, there is provided a process for producing spindle-shaped magnetic iron oxide particles comprising the steps of:

aging an aqueous solution containing $FeCO_3$ obtained by reacting an aqueous alkali carbonate with an aqueous ferrous salt solution in a non-oxidizing atmosphere at a temperature of 40° to 60° C. for 50 to 100 minutes, the amount of aqueous alkali carbonate being 1.5 to 3.5 times equivalent based on $Fe^{2+}$ in said aqueous ferrous salt solution;

blowing an oxygen-containing gas into the suspension containing said $FeCO_3$ for oxidation to produce spindle-shaped goethite particles;

reducing said spindle-shaped goethite particles or spindle-shaped hematite particles obtained by baking said spindle-shaped goethite particles under heating in a reducing gas to produce spindle-shaped magnetite ($FeOx.Fe_2O_3$, $0<x\leq 1$) particles as precursor particles;

mixing an aqueous dispersion of said precursor particles with at least an aqueous Co salt solution and an aqueous alkaline solution so that the mixed dispersion has a pH of not less than 11; and heating said mixed dispersion to a temperature of 50° to 100° C., thereby obtaining Co-modified spindle-shaped magnetite particle of the 5th aspect.

In a 14th aspect of the present invention, there is provided a process for producing spindle-shaped magnetic iron oxide particles comprising the steps of:

aging a suspension containing $FeCO_3$ obtained by reacting an aqueous alkali carbonate with an aqueous ferrous salt solution in a non-oxidizing atmosphere at a temperature of 40° to 60° C. for 50 to 100 minutes, the amount of aqueous alkali carbonate being 1.5 to 3.5 times equivalent based on $Fe^{2+}$ in said aqueous ferrous salt solution, and blowing an oxygen-containing gas into said suspension containing said $FeCO_3$ for oxidation, wherein a zinc compound is added to a solution of said aqueous alkali carbonate, said aqueous ferrous salt solution, said suspension containing $FeCO_3$ or said suspension containing $FeCO_3$ in the course of aging prior to the oxidation step of blowing said oxygen-containing gas thereinto, thereby obtaining spindle-shaped goethite particles containing zinc;

reducing said spindle-shaped goethite particles or spindle-shaped hematite particles obtained by baking said spindle-shaped goethite particles under heating in a reducing gas to produce spindle-shaped magnetite ($FeOx.Fe_2O_3$, $0<x\leq 1$) particles containing zinc as precursor particles;

mixing an aqueous dispersion of said precursor particles with at least an aqueous Co salt solution and an aqueous alkaline solution so that the mixed dispersion has a pH of not less than 11; and heating said mixed dispersion to a temperature of 50° to 100° C., thereby obtaining Co-modified spindle-shaped magnetite particles containing zinc of the 6th aspect.

In a 15th aspect of the present invention, there is provided a process for producing spindle-shaped magnetic iron oxide particles comprising the steps of:

oxidizing the spindle-shaped magnetite particles obtained in the 13th aspect to produce spindle-shaped maghemite particles as precursor particles;

mixing an aqueous dispersion of said precursor particles with at least an aqueous Co salt solution and an aqueous alkaline solution so that the mixed dispersion has a pH of not less than 11; and heating said mixed dispersion to a temperature of 50° to 100° C., thereby obtaining Co-modified spindle-shaped maghemite particles of the 7th aspect.

In a 16th aspect of the present invention, there is provided a process for producing spindle-shaped magnetic iron oxide particles comprising the steps of:

oxidizing spindle-shaped magnetite particles containing zinc obtained in the 14th aspect to produce spindle-shaped maghemite particles containing zinc as precursor particles;

mixing an aqueous dispersion of said precursor particles with at least an aqueous Co salt solution and an aqueous alkaline solution so that the mixed dispersion has a pH of not less than 11; and heating said mixed dispersion to a temperature of 50° to 100° C., thereby obtaining Co-modified spindle-shaped maghemite particles containing zinc of the 8th aspect.

In a 17th aspect of the present invention, there is provided a process for producing spindle-shaped magnetic iron oxide particles comprising the steps of:

aging a suspension containing $FeCO_3$ obtained by reacting an aqueous alkali carbonate with an aqueous ferrous salt solution in a non-oxidizing atmosphere at a temperature of 30° to 60° C. for 10 to 100 minutes, and blowing an oxygen-containing gas into said suspension containing said $FeCO_3$ for oxidation, wherein 1 to 50% of an aqueous hydroxide based on said aqueous alkali carbonate is added to a solution of said aqueous alkali carbonate, said suspension containing $FeCO_3$ or said suspension containing $FeCO_3$ in the course of aging prior to the oxidation step of blowing said oxygen-containing gas thereinto so that the total amount of aqueous alkali carbonate and aqueous alkali hydroxide is 1.1 to 2.5 times equivalent based on $Fe^{2+}$ in said aqueous ferrous salt solution;

reducing said goethite particles or spindle-shaped hematite particles obtained by baking said goethite particles under heating in a reducing gas to produce spindle-shaped magnetite particles; and oxidizing said spindle-shaped magnetite particles, if necessary, thereby obtaining spindle-shaped maghemite ($FeOx.Fe_2O_3$, $0<x\leq 1$) particles.

In a 18th aspect of the present invention, there is provided a process for producing spindle-shaped magnetic iron oxide particles comprising the steps of:

aging a suspension containing $FeCO_3$ obtained by reacting an aqueous alkali carbonate with an aqueous ferrous salt solution in a non-oxidizing atmosphere at a temperature of 30° to 60° C. for 10 to 100 minutes, and blowing an oxygen-containing gas into said suspension containing said $FeCO_3$ for oxidation, wherein 1 to 50% of an aqueous hydroxide based on said aqueous alkali carbonate is added to a solution of said aqueous alkali carbonate, said suspension containing $FeCO_3$ or said suspension containing $FeCO_3$ in the course of aging prior to the oxidation step of blowing said oxygen-containing gas thereinto so that the total amount of aqueous alkali carbonate and aqueous alkali hydroxide is 1.1 to 2.5 times equivalent based on $Fe^{2+}$ in said aqueous ferrous salt solution, and a zinc compound is added to a solution of said aqueous alkali carbonate, said aqueous ferrous salt solution, said suspension containing $FeCO_3$ or said suspension containing $FeCO_3$ in the course of aging prior to the oxidation step of blowing said oxygen-containing gas thereinto, thereby obtaining spindle-shaped goethite particles containing zinc;

reducing said goethite particles containing zinc or spindle-shaped hematite particles containing zinc obtained by baking said goethite particles containing zinc under heating in a reducing gas to produce spindle-shaped magnetite ($FeOx.Fe_2O_3$, $0<x\leq 1$) particles containing zinc; and oxidizing said spindle-shaped magnetite particles, if necessary, thereby obtaining spindle-shaped maghemite particles containing zinc.

In a 19th aspect of the present invention, there is provided a process for producing spindle-shaped magnetic iron oxide particles comprising the steps of:

aging a suspension containing $FeCO_3$ obtained by reacting an aqueous alkali carbonate with an aqueous ferrous salt solution in a non-oxidizing atmosphere at a temperature of 30° to 60° C. for 10 to 100 minutes, and blowing an oxygen-containing gas into said suspension containing said $FeCO_3$ for oxidation, wherein 1 to 50% of an aqueous hydroxide based on said aqueous alkali carbonate is added to a solution of said aqueous alkali carbonate, said suspension containing $FeCO_3$ or said suspension containing $FeCO_3$ in the course of aging prior to the oxidation step of blowing said oxygen-containing gas thereinto so that the total amount of aqueous alkali carbonate and aqueous alkali hydroxide is 1.1 to 2.5 times equivalent based $Fe^{2+}$ in said aqueous ferrous salt solution;

reducing said goethite particles or spindle-shaped hematite particles obtained by baking said goethite particles under heating in a reducing gas to produce spindle-shaped magnetite ($FeOx.Fe_2O_3$, $0<x\leq 1$) particles as precursor particles, and oxidizing said magnetite particles, if necessary, to produce spindle-shaped maghemite particles as precursor particles;

mixing an aqueous dispersion of said precursor particles with at least an aqueous Co salt solution and an aqueous alkaline solution so that the mixed dispersion has a pH of not less than 11; and heating said mixed dispersion to a temperature of 50° to 100° C., thereby obtaining spindle-shaped magnetite or maghemite particles with the surfaces modified by 0.5 to 15.0 atomic% of Co based on Fe and Co.

In a 20th aspect of the present invention, there is provided a process for producing spindle-shaped magnetic iron oxide particles comprising the steps of:

aging a suspension containing $FeCO_3$ obtained by reacting an aqueous alkali carbonate with an aqueous ferrous salt solution in a non-oxidizing atmosphere at a temperature of 30 ° to 60° C. for 10 to 100 minutes, and blowing an oxygen-containing gas into said suspension containing said $FeCO_3$ for oxidation, wherein 1 to 50% of an aqueous hydroxide based on said aqueous alkali carbonate is added to a solution of said aqueous alkali carbonate, said suspension containing $FeCO_3$ or said suspension containing $FeCO_3$ in the course of aging prior to the oxidation step of blowing said oxygen-containing gas thereinto so that the total amount of aqueous alkali carbonate and aqueous alkali hydroxide is 1.1 to 2.5 times equivalent based on $Fe^{2+}$ in said aqueous ferrous salt solution, and a zinc compound is added to a solution of said aqueous alkali carbonate, said aqueous ferrous salt solution, said suspension containing $FeCO_3$ or said suspension containing $FeCO_3$ in the course of aging prior to the oxidation step of blowing said oxygen-containing gas thereinto, thereby obtaining spindle-shaped goethite particles containing zinc;

reducing said goethite particles containing zinc or spindle-shaped hematite particles containing zinc which are obtained by baking said goethite particles containing zinc under heating in a reducing gas to produce spindle-shaped magnetite ($FeO_x \cdot Fe_2O_3$, $0<x\leq 1$) particles containing zinc as precursor particles, and oxidizing said magnetite particles, if necessary, to produce spindle-shaped maghemite particles containing zinc as precursor particles;

mixing an aqueous dispersion of said precursor particles with at least an aqueous Co salt solution and an aqueous alkaline solution so that the mixed dispersion has a pH of not less than 11; and heating said mixed dispersion to a temperature of 50° to 100° C. thereby obtaining spindle-shaped magnetite or maghemite particles containing zinc with the surfaces modified by 0.5 to 15.0 atomic% of Co based on Fe and Co.

DETAILED DESCRIPTION OF THE INVENTION

The present invention will be explained with reference to a part of the numerous experiments carried out by the present inventors.

Figure 1:
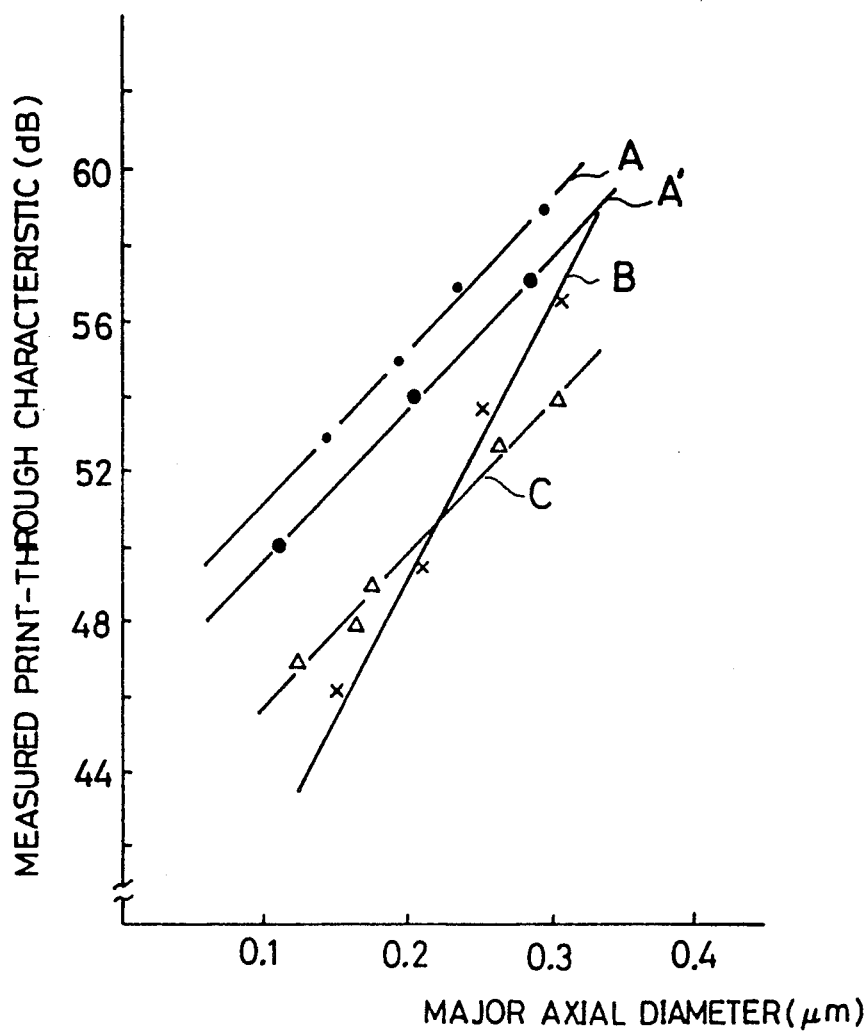
FIG. 1 shows the relationship between the major axial diameter and the measured value of the print-through characteristic of maghemite particles.

FIG. 1 shows the relationship between the major axial diameter and the measured print-through characteristic of maghemite particles. In FIG. 1, the straight line A represents the characteristics of the spindle-shaped maghemite particles in accordance with the present invention, A' represents the characteristics of the spindle-shaped maghemite particles obtained by an economical resources - energy reaction, B represents the characteristics of the acicular maghemite particles obtained by the conventional method described in Japanese Patent Publication No. 39-5610 (1964) and C represents the characteristics of the spindle-shaped maghemite particles obtained by the conventional method described in Japanese Patent Application Laid-Open (KOKAI) No. 50-80999 (1975). As is clear from FIG. 1, the spindle-shaped maghemite particles of the present invention have an excellent print-through characteristic.

The magnetite ($FeO_x \cdot Fe_2O_3$, $0<x\leq 1$) particles in accordance with the present invention shows a similar tendency to the straight line A in FIG. 1, and is also excellent in print-through characteristic.

Figure 2:
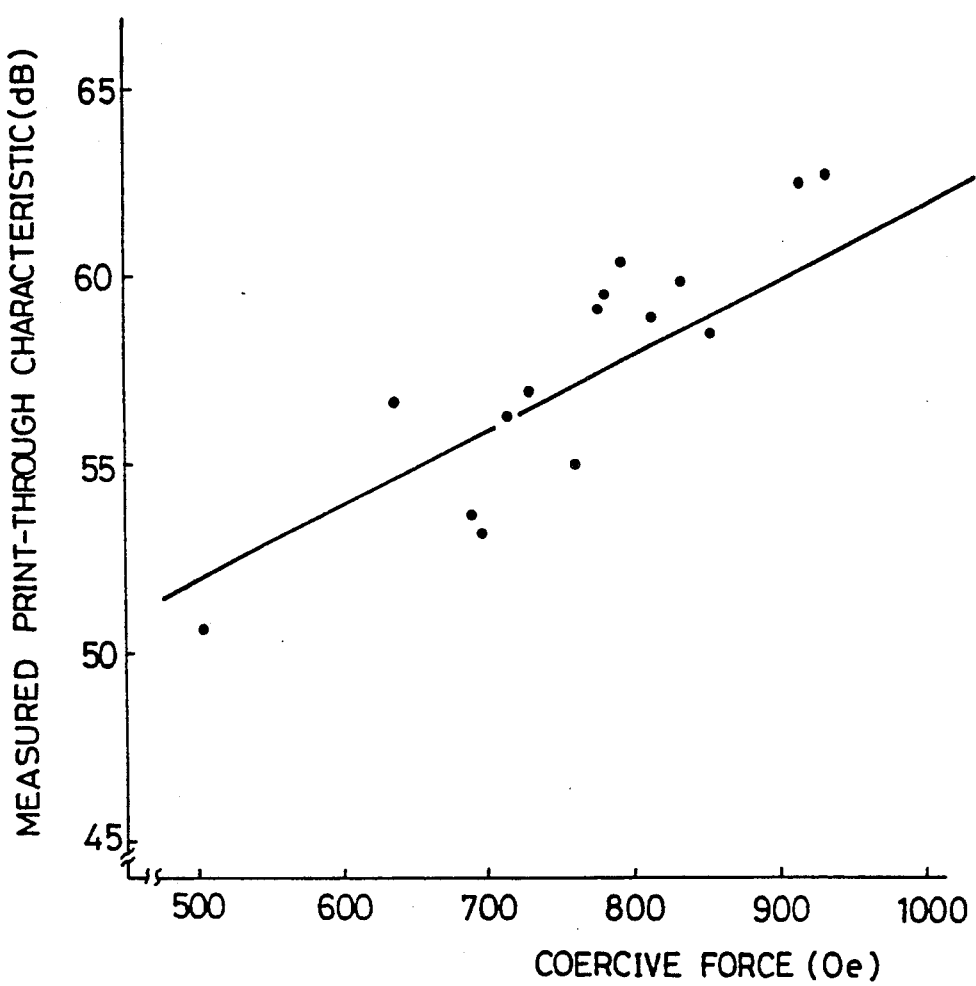
FIGS. 2 and 3 show the relationship between the measured value of the coercive force and the measured value of the print-through characteristic of magnetite particles and maghemite particles, respectively.
Figure 3:
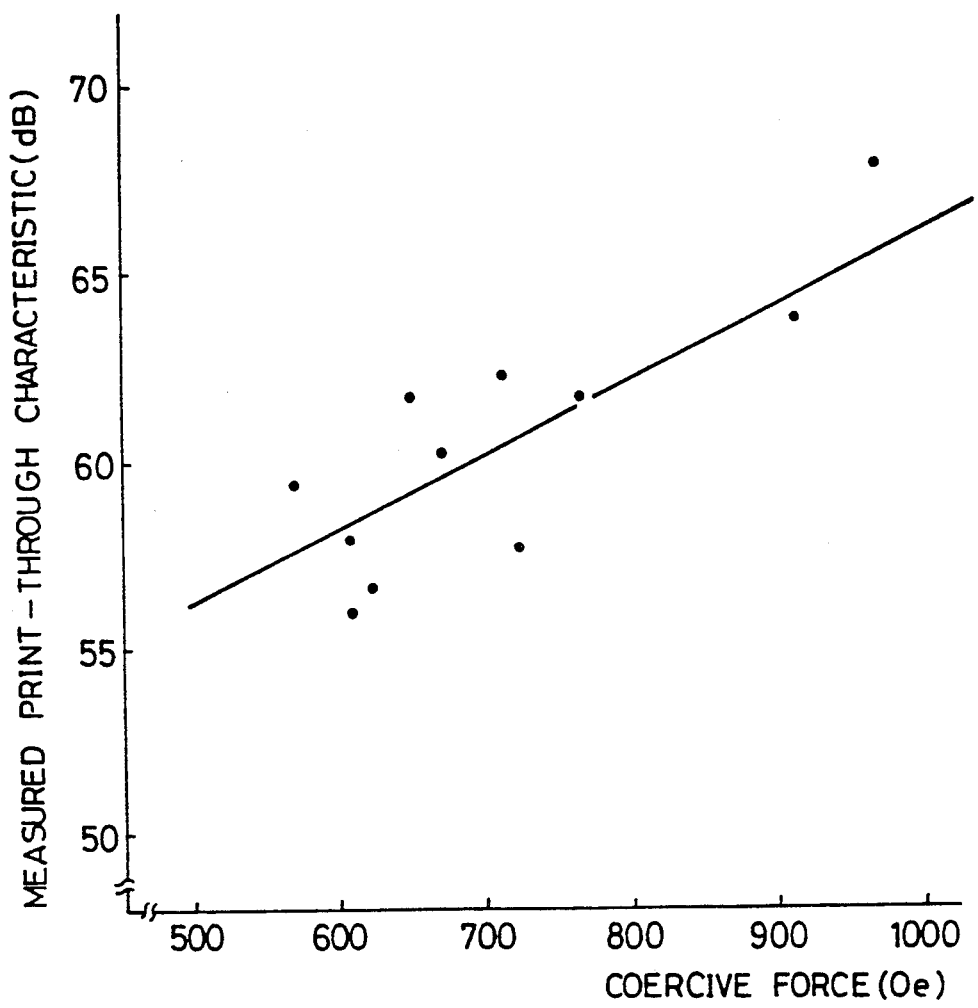

It is known that the print-through characteristic is strongly influenced on the magnitude of the coercive force which is higher than 480 to 500 Oe. FIGS. 2 and 3 show the relationship between the measured value of the coercive force and the measured value of the print-through characteristic of magnetite particles and maghemite particles, respectively, obtained from many experiments carried out in the present invention. It is clear from FIGS. 2 and 3 that there is a constant relationship between the coercive force and the print-through characteristic.

Figure 4B:
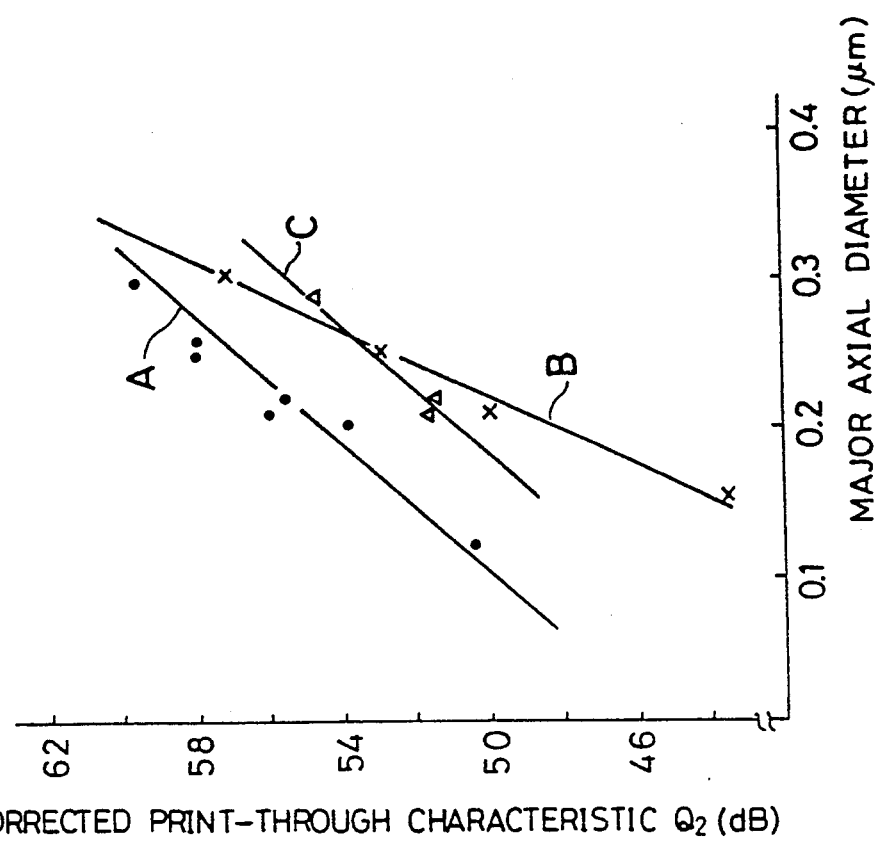
FIGS. 4(a) and 4(b), 5(a) and 5(b) show the relationship between the correction value of the print-through characteristic at 700 Oe and the major axial diameter of Co-modified magnetite particles and Co-modified maghemite particles, respectively.
Figure 4A:
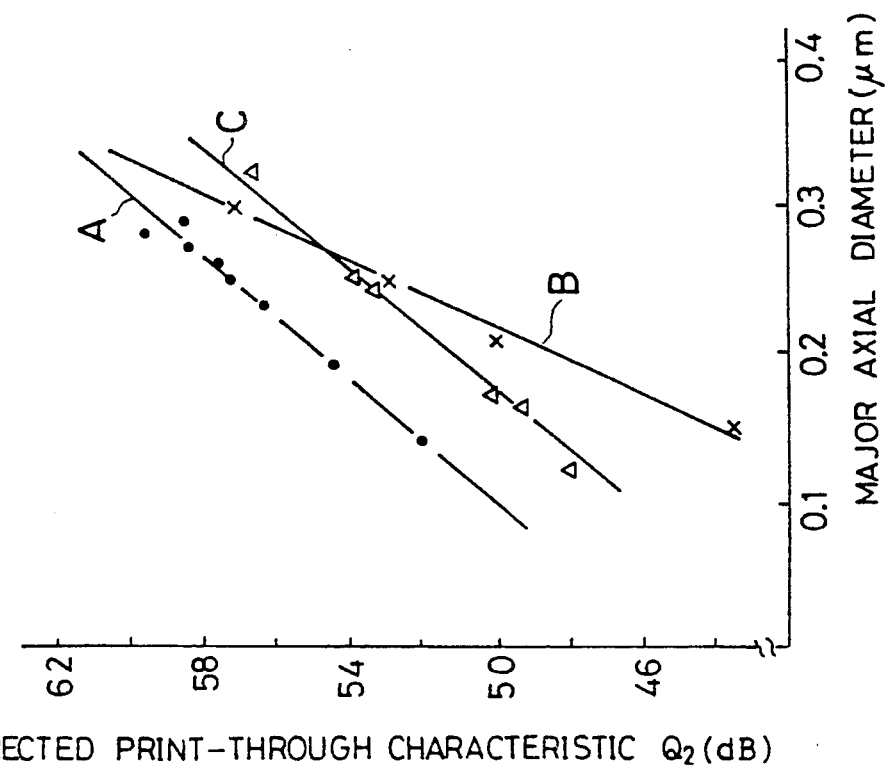
Figure 5A:
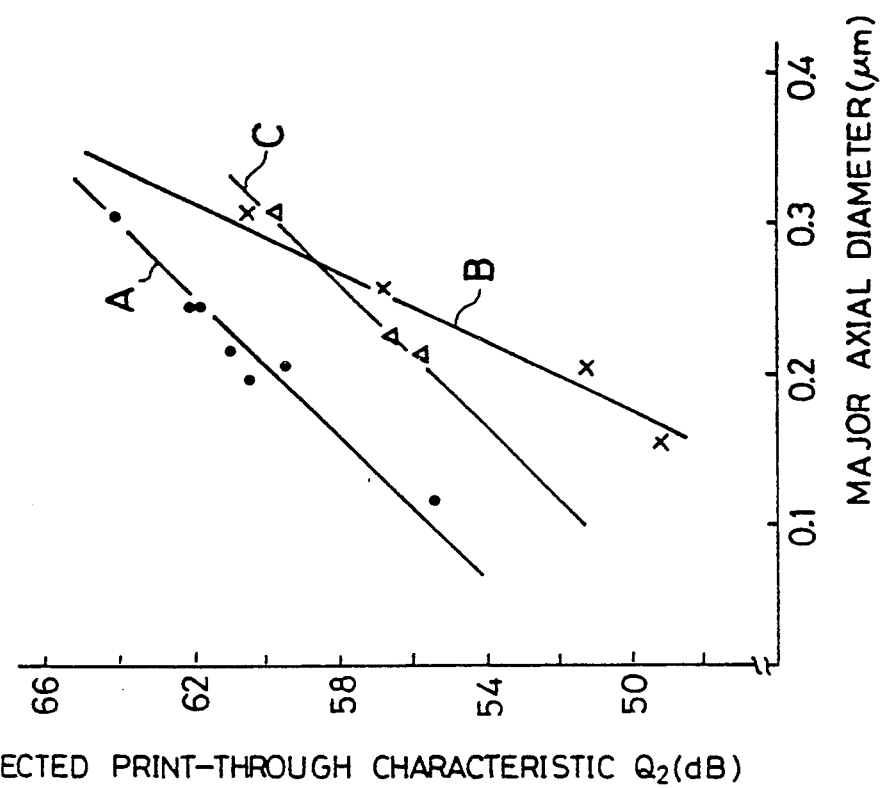
Figure 5B:
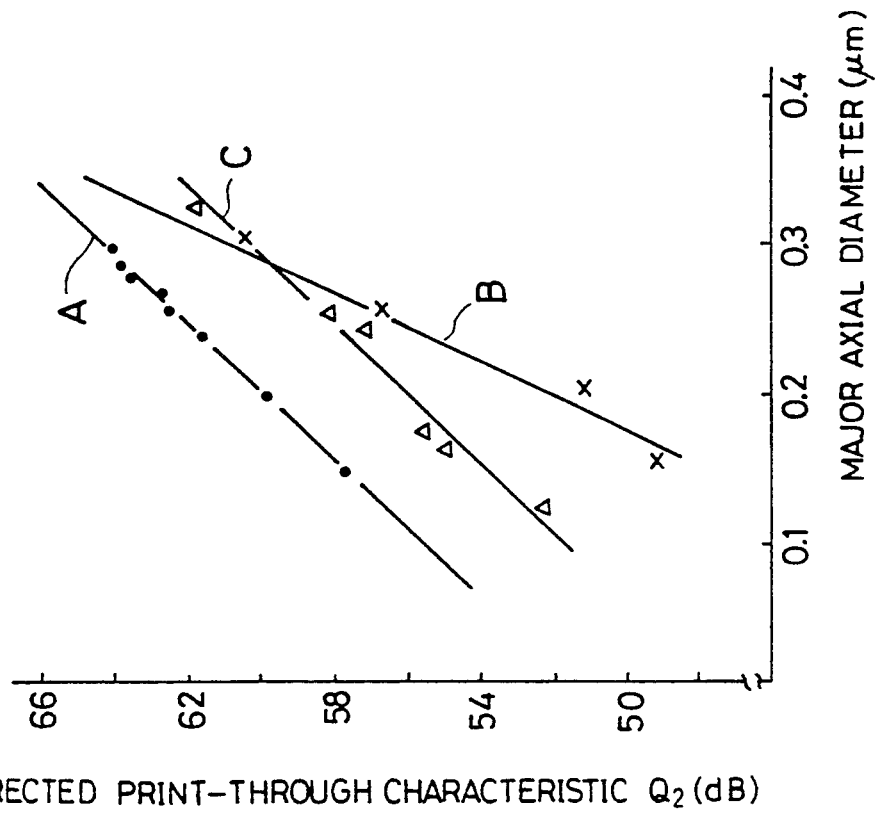

FIGS. 4(a) and 5(a) show the relationship between the correction value of the print-through characteristic at 700 Oe and the major axial diameter of Co-modified magnetite particles and Co-modified maghemite particles, respectively, and FIGS. 4(b) and 5(b) show the relationship between the correction value of the print-through characteristic at 700 Oe and the major axial diameter of Co-modified magnetite particles and Co-modified maghemite particles, respectively, obtained by the economical resources - energy reaction. In these drawings, the straight lines A, B and C represent the characteristics of the magnetic iron oxide particles with the surfaces modified by Co, the Co-modified magnetic iron oxide particles of the straight lines A, B and C being produced by modifying as the respective precursors the spindle-shaped magnetic iron oxide particles obtained the present invention; the acicular magnetic iron oxide particles obtained by the conventional method described in Japanese Patent Publication No. 39-5610 (1964); and the spindle-shaped magnetic iron oxide particles obtained by the conventional method described in Japanese Patent Application Laid-Open (KOKAI) No. 50-80999 (1975), by Co in the same way as in later described Example 1. It is clear from FIGS. 4(a), 4(b), 5(a) and 5(b) that there is a constant relationship between the correction value of print-through characteristic at 700 Oe and the major axial diameter. The print-through characteristic of the Co-modified magnetic iron oxide particles of the present invention is excellent.

Figure 6A:
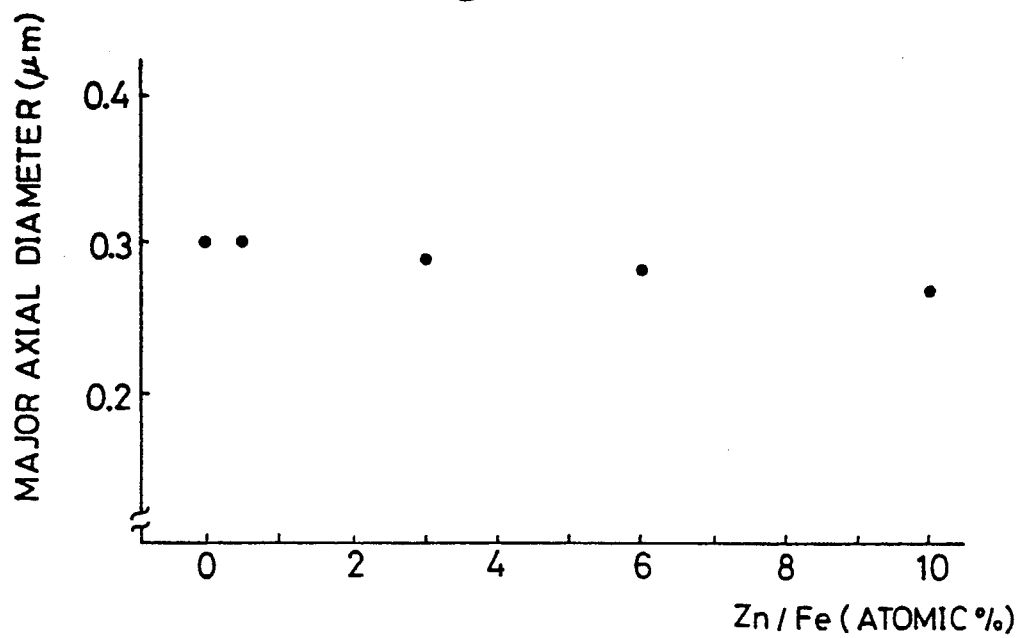
FIGS. 6(a) and 6(b), 7(a) and 7(b) show the relationship between the existent amount of zinc sulfate and the major axial diameter, and the relationship between the existent amount of zinc sulfate and the axial ratio (major axial diameter/minor axial diameter), respectively, of spindle-shaped goethite particles.
Figure 7A:
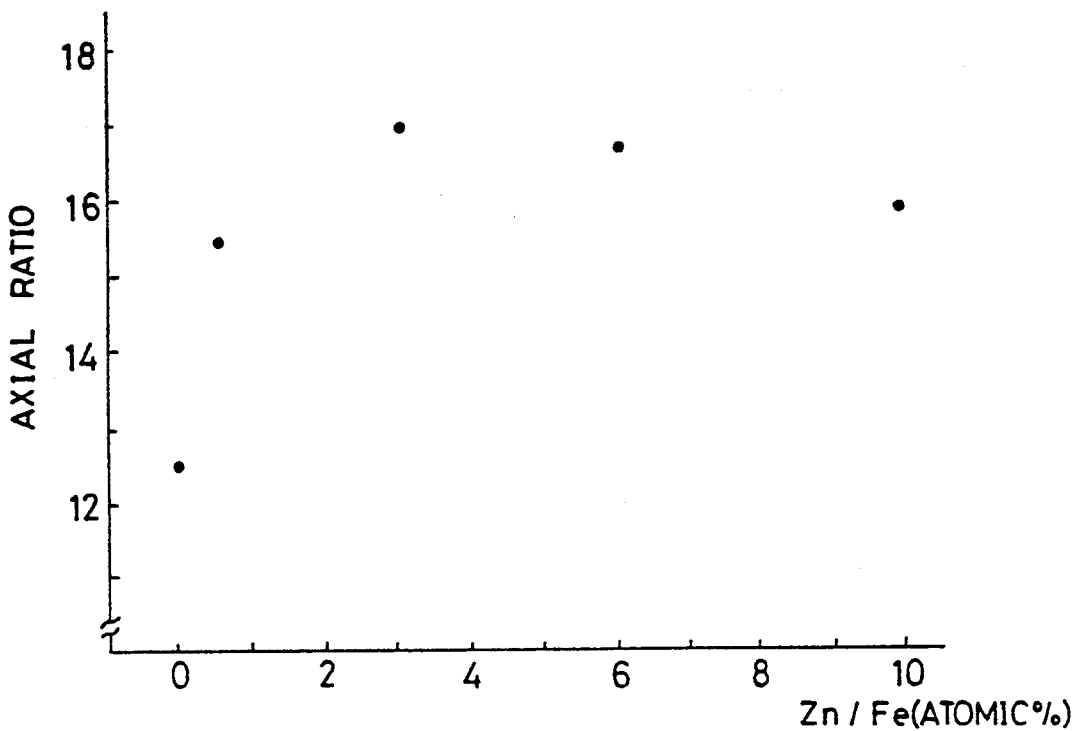

FIGS. 6(a) and 7(a) show the relationship between the existent amount of zinc sulfate and the major axial diameter and the relationship between the existent amount of zinc sulfate and the axial ratio (major axial diameter/minor axial diameter), respectively, of spindle-shaped goethite particles obtained the present invention.

The ordinates represent the major axial diameter and the axial ratio (major axial diameter/minor axial diameter), respectively, of the spindle-shaped goethite particles obtained when the existent amount of zinc sulfate is 0 to 10.0 atomic % of zinc based on Fe under the reaction conditions in later-described Example 5, and the abscissa reprerent the existent amount of zinc sulfate.

Figure 6B:
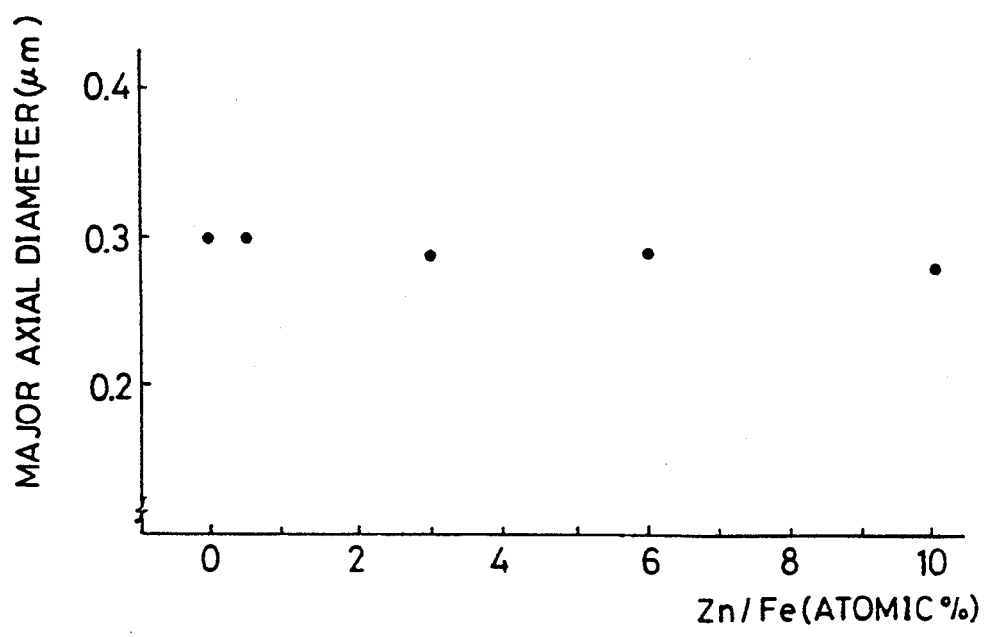
Figure 7B:
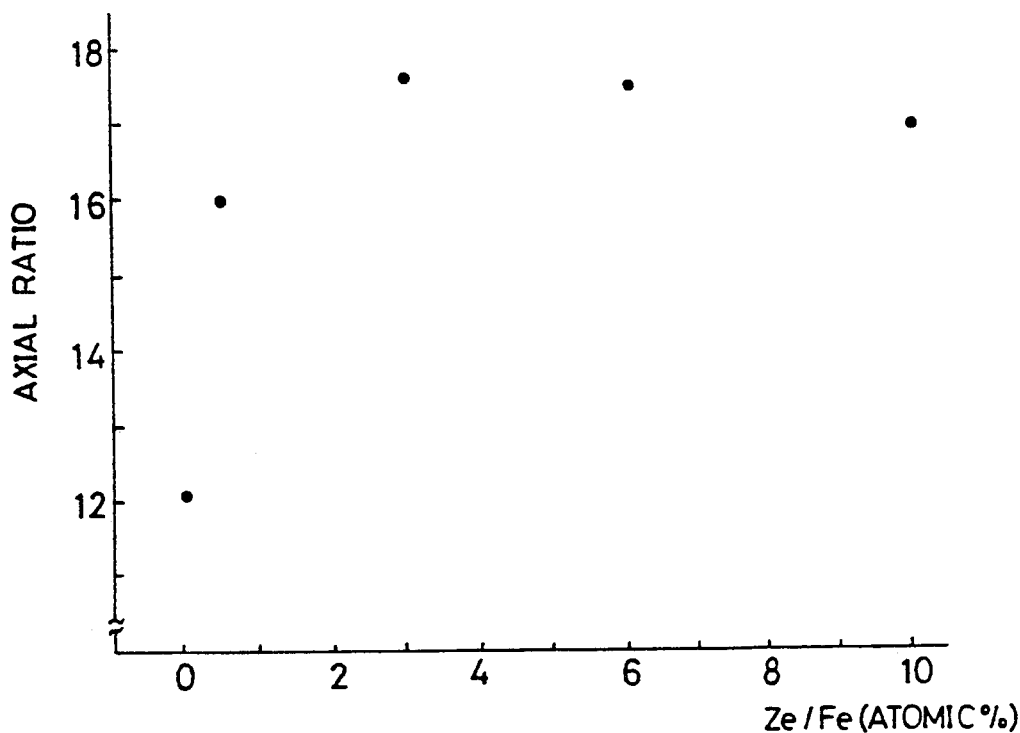

FIGS. 6(b) and 7(b) show the relationship between the existent amount of zinc sulfate and the major axial diameter and the axial ratio (major axial diameter/minor axial diameter), respectively, of spindle-shaped goethite particles obtained by an economical resources - energy reaction.

The ordinates represent the major axial diameter and the axial ratio (major axial diameter/minor axial diamter), respectively, of the spindle-shaped goethite particles obtained when the existent amount of zinc sulfate is 0 to 10.0 atomic % of zinc based on Fe under the reaction conditions in later-described Example 52, and the abscissa represent the existent amount of zinc sulfate.

As is obvious from FIGS. 6(a), 6(b), 7(a) and 7(b), the influence of the existence of zinc sulfate on the major axial diameter of the spindle-shaped goethite particles is small, while the axial ratio (major axial diameter/minor axial diameter) has a tendency to more increase the more the existent amount of zinc sulfate increases.

Consequently, it is considered that a zinc compound has an activity of regulating the growth of the spindle-shaped goethite particles in the minor axial direction.

Incidentally, a method of aging a suspension containing $FeCO_3$ in a non-oxidizing atmosphere is disclosed in Japanese Patent Publication No. 59-48768 (1984). This is, however, a method of obtaining spindle-shaped goethite particles having a uniform particle size by treating a suspension containing $FeCO_3$ at room temperature for 120 to 240 minutes in a non-oxidizing atmosphere, which has been produced by using 1.06 times as much aqueous alkali carbonate as $Fe^{2+}$, and this method is completely different from the present invention which is aimed at producing spindle-shaped goethite particles having a large axial ratio (major axial diameter/minor axial diameter).

By the way, the axial ratio (major axial diameter/minor axial diameter) of the spindle-shaped goethite particles obtained by the method disclosed in Japanese Patent Publication No. 59-48768 (1984) is about 4 in "Examples 1 and 2".

As examples of an aqueous ferrous salt solution used in the present invention, an aqueous ferrous sulfate and an aqueous ferrous chloride may be exemplified.

As examples of an aqueous alkali carbonate used in the present invention, aqueous solutions of sodium carbonate, potassium carbonate and ammonium carbonate may be exemplified.

The amount of aqueous alkali carbonate used in the present invention is 1.5 to 3.5 times equivalent based on $Fe^{2+}$ in the aqueous ferrous salt solution. If it is less than 1.5 times equivalent, the particle size of the spindle-shaped goethite particles obtained becomes non-uniform and the particles aggregate, thereby deteriorating the dispersibility. On the other hand, if it is more than 3.5 times equivalent, the axial ratio (major axial diameter/minor axial diameter) has a tendency to more decrease the more the amount of aqueous alkali carbonate added increases, so that it is difficult to obtain spindle-shaped goethite particles having a large axial ratio (major axial diameter/minor axial diameter). In addition, use of a large amount of expensive aqueous alkali carbonate is uneconomical.

As an aqueous alkali hydroxide used in a method of producing spindle-shaped goethite particles by economical resources - energy reaction according to the present invention, an aqueous sodium hydroxide and an aqueous potassium hydroxide may be exemplified.

An aqueous alkali hydroxide may be added to any of the aqueous alkali carbonate, the suspension containing $FeCO_3$ and the suspension containing $FeCO_3$ in the course of aging prior to the oxidation step of blowing the oxygen-containing gas thereinto. In any case, the economical resources - energy reaction is possible.

The amount of alkali hydroxide added is 1 to 50% based on an alkali carbonate in terms of normal.

If it is less than 1%, the economical resources - energy reaction is difficult. On the other hand, if it is more than 50%, granular-shaped magnetite particles are disadvantageously contaminated in the spindle-shaped goethite particles.

The total amount of aqueous alkali carbonate and aqueous alkali hydroxide used in the present invention is 1.1 to 2.5 times equivalent based on $Fe^{2+}$ in the aqueous ferrous salt solution and it is possible to reduce the mixing ratio of an aqueous alkaline solution to Fe. If it is less than 1.1 times equivalent, granular-shaped magnetite particles are disadvantageously contaminated in the spindle-shaped goethite particles. On the other hand, if it is more than 2.5 times equivalent, the amount of expensive alkali used is uneconomically increased.

The aging step in the present invention is carried out in an inert atmosphere by blowing an inert gas such as $N_2$ gas into a solution under agitation with the gas or mechanical agitation.

The aging temperature of the suspension containing $FeCO_3$ in the present invention is 40° to 60° C. If the temperature is lower than 40° C., the axial ratio (major axial diameter/minor axial diameter) becomes small. In other words, it is difficult to obtain spindle-shaped goethite particles having a large axial ratio (major axial diameter/minor axial diameter). Even if the temperature is higher than 60° C., it is possible to obtain spindle-shaped goethite particles having a large axial ratio (major axial diameter/minor axial diameter), but to raise the aging temperature more than necessary is meaningless.

The aging time of the suspension containing FeCO$_3$ in the present invention is 50 to 100 minutes. If the aging time is less than 50 minutes, it is difficult to obtain spindle-shaped goethite particles having a large axial ratio (major axial diameter/minor axial diameter). Even if the aging time is more than 100 minutes, it is possible to obtain spindle-shaped goethite particles having a large axial ratio (major axial diameter/minor axial diameter), but to prolong the aging time more than necessary is meaningless.

The aging temperature of the suspension containing FeCO$_3$ in a method of producing spindle-shaped goethite particles by economical resources - energy reaction in the present invention is 30° to 60° C. If the temperature is lower than 30° C., the axial ratio (major axial diameter/minor axial diameter) becomes small. In other words, it is difficult to obtain spindle-shaped goethite particles having a large axial ratio (major axial diameter/minor axial diameter). The aging time is 10 to 100 minutes. If the aging time is less than 10 minutes, it is difficult to obtain spindle-shaped goethite particles having a large axial ratio (major axial diameter/minor axial diameter).

That is, it is possible to obtain spindle-shaped goethite particles having a large axial ratio (major axial diameter/minor axial diameter) even if the aging temperature is lowered by about 10° C. and the aging temperature is shortened by about 40 minutes by a method of producing magnetic iron oxide particles with economical resources - energy reaction in comparison with a method of using an aqueous alkali carbonate singly.

As the zinc compound in the present invention, zinc sulfate, zinc chloride, etc. are usable.

The existent amount of zinc compound is 0.3 to 10.0 atomic% (calculated as Zn) based on Fe in the aqueous ferrous salt solution. If it is less than 0.3 atomic%, it is difficult to obtain spindle-shaped goethite particles having a large axial ratio (major axial diameter/minor axial diameter). Even if it is more than 10.0 atomic%, it is possible to obtain spindle-shaped goethite particles having a large axial ratio (major axial diameter/minor axial diameter), but the magnetization value of the magnetic iron oxide particles obtained by reducing under heating the goethite particles, or further oxidizing the product, if necessary, is lowered. In consideration of the axial ratio (major axial diameter/minor axial diameter) of the spindle-shaped goethite particles, the existent amount of zinc compound is preferably 0.5 to 8.0 atomic%.

Almost the whole amount of zinc compound added is contained in the spindle-shaped goethite particles produced, as shown in later described Examples. Since a zinc compound participates in the axial ratio (major axial diameter/minor axial diameter) of the spindle-shaped goethite particles produced, it is necessary that the zinc compound exists prior to the oxidation of the suspension containing FeCO$_3$ by blowing an oxygen-containing gas thereinto. The zinc compound is therefore added to any of the aqueous alkali carbonate, the aqueous ferrous salt solution, the suspension containing FeCO$_3$ and the suspension containing FeCO$_3$ in the course of aging prior to the oxidization step of blowing the oxygen-containing gas thereinto. Adding the zinc compound to the suspension containing FeCO$_3$ in the course of aging is the most effective.

The reaction temperature in the oxidation process in the present invention is 40° to 70° C. If the temperature is lower than 40° C., it is difficult to obtain spindle-shaped goethite particles. On the other hand, if the temperature is higher than 70° C., granular hematite particles are contaminated in the spindle-shaped goethite particles.

The reaction temperature in the oxidation process in the method of producing spindle-shaped goethite particles with economical resources - energy reaction is 30° to 70° C. If the reaction temperature is lower than 30° C., it is difficult to obtain spindle-shaped goethite particles having a large axial ratio (major axial diameter/minor axial diameter).

The pH in the oxidation process in the present invention is 7 to 11. If the pH is less than 7 or more than 11, it is difficult to obtain spindle-shaped goethite particles.

The oxidation in the present invention is carried out by blowing an oxygen-containing gas such as air into the solution under agitation with the gas or mechanical agitation.

In the present invention, it is possible to add a metal other than Fe such as Co, Ni, Cr, Zn, Al and Mn which are conventionally generally added in the generation of goethite particles for the purpose of improving various properties of magnetic iron oxide particles. In this case, it is also possible to obtain spindle-shaped goethite particles having a large axial ratio (major axial diameter/minor axial diameter).

As the starting material in the present invention, not only the spindle-shaped goethite particles produced but also spindle-shaped hematite obtained by dehydrating the goethite particles by an ordinary method and highly-densified spindle-shaped hematite obtained by heating the goethite particles at 250° to 800° C. in a non-reducing atomosphere are usable.

The reduction under heating in a reducing agent and oxidation in the present invention can be carried out by an ordinary method.

If the starting material particles are coated with a material having a sintering preventing effect such as Si, Al and P compounds by a known method prior to the reduction under heating so as to prevent the sintering between the particles, the maintenance of the particle shape and the axial ratio (major axial diameter/minor axial dimeter) of the starting material particles is facilitated.

Co-modification of precursor particles in the present invention can be carried out by an ordinary method. For example, the Co-modification is carried out by heating a mixture obtained by mixing an aqueous dispersion of the precursor particles with at least an aqueous Co salt solution and an aqueous alkaline solution and having a pH of not less than 11 at a temperature of 50° to 100° C., as described in, e.g., Japanese Patent Publication Nos. 52-24237 (1977), 52-24238 (1977), 52-36751 (1977) and 52-36863 (1977).

As the precursor particles in the present invention, the spindle-shaped magnetite (FeOx.Fe$_2$O$_3$, $0<x\leq 1$) particles, the spindle-shaped maghemite particles, the spindle-shaped magnetite (FeOx.Fe$_2$O$_3$, $0<x\leq 1$) particles containing zinc and the spindle-shaped maghemite particles may be exemplified.

The aqueous Co salt solution may contain an aqueous Fe(II) salt, if necessary.

As the aqueous Co salt solution in the present invention, aqueous solutions of cobalt sulfate, cobalt chloride and cobalt nitride, etc. are usable.

As the aqueous Fe(II) salt solution, aqueous solutions of ferrous sulfate, ferrous chloride, ferrous nitride may be exemplified.

As the aqueous alkali solution used for Co-modification in the present invention, an aqueous sodium hydroxide and an aqueous potassium hydroxide are usable.

The temperature for Co-modification in the present invention participates in the treating time. If the temperature is lower than 50° C., it is difficult to produce the Co-modified magnetite particles or maghemite particles, and even if they are produced, treating for a very long time is required.

The amount of Co for Co-modification in the present invention is 0.5 to 15.0 atomic% (calculated as Co) based on Fe and Co. If it is less than 0.5 atomic%, the effect of improving the coercive force of the spindle-shaped magnetite particles produced is unsatisfactory. Even if it is more than 15.0 atomic%, it is possible to obtain the effect of improving the coercive force of the spindle-shaped magnetite particles or maghemite particles produced, but modification more than necessary is meaningless.

Almost the whole amount of Co added is utilized for modification of the surfaces of the magnetic iron oxide particles.

In consideration of the coercive force of the spindle-shaped magnetite particles or maghemite particles, the amount of Co added is preferably 2.0 to 13.0 atomic%.

The Co-modified surfaces of the magnetic iron oxide particles obtained in the present invention may be coated with a hydroxide or an oxide such as Al, Si and Zn which are generally used for improving the dispersibility in a binder.

The spindle-shaped magnetic iron oxide particles according to the present invention, which have a uniform particle size and shape, are substantially free of dendrites, and have a large axial ratio (major axial diameter/minor axial diameter) (e.g., not less than 7.0, and not less than 8.0 in the case of zinc-containing magnetic iron oxide particles) and an excellent print-through characteristic (the correction value of print-through characteristic is not less than 45.0 dB, in the case of magnetite particles, and not less than 53.0 dB, preferably not less than 54.0 dB in the case of maghemite particles), are suitable as magnetic iron oxide particles having a high recording density, a high sensitivity and a high output which are now in the strongest demand.

The spindle-shaped magnetic iron oxide particles with the surfaces thereof modified by Co according to the present invention, which have a fine particle size, in particular, a major axial diameter of 0.1 to 0.3 μm, a large axial ratio (major axial diameter/minor axial diameter) (e.g., not less than 7.0, and not less than 8.0 in the case of zinc-containing magnetic iron oxide particles), a high coercive force (e.g., 480 to 1000 Oe) and an excellent print-through characteristic (the correction value of print-through characteristic is not less than 52.0 dB, preferably not less than 53.0 dB in the case of magnetite particles, and not less than 57.0 dB, preferably not less than 58.0 dB in the case of maghemite particles), are suitable as magnetic iron oxide particles having a high recording density, a high sensitivity and a high output which are now in the strongest demand.

According to the method of producing spindle-shaped magnetic iron oxide particles with economical resources - energy reaction of the present invention, it is possible to produce spindle-shaped magnetic iron oxide particles which have a large axial ratio (major axial diameter/minor axial diameter) (e.g., not less than 7.0) and an excellent print-through characteristic (the correction value of print-through characteristic is not less than 45.0 dB in the case of magnetite particles, and not less than 53.0 dB, preferably not less than 54.0 dB in the case of maghemite particles) industrially and economically advantageously by an economical resources - energy reaction which is capable of enhancing the productivity because it is possible to react at a high concentration, to reduce the ratio of an aqueous alkaline solution, and to reduce the amount of energy in the aging process.

According to the method of producing spindle-shaped magnetic iron oxide particles with the surface thereof modified by Co with economical resources - energy reaction of the present invention, since it is possible to produce spindle-shaped goethite particles having a large axial ratio (major axial diameter/minor axial diameter) by an economical resources - energy reaction which is capable of enhancing the productivity because it is possible to react at a high concentration, to reduce the ratio of an alkaline solution, and to reduce the amount of energy in the aging process. Accordingly, it is possible to produce spindle-shaped magnetic iron oxide particles with the surfaces thereof modified by Co industrially and economically advantageously which have a fine particle size, in particular, a major axial diameter of not more than 0.3 μm, a large axial ratio (major axial diameter/minor axial diameter) (e.g., not less than 7.0), a high coercive force (e.g., not less than 480 Oe) and an excellent print-through characteristic (the correction value of print-through characteristic is not less than 52.0 dB, preferably not less than 53.0 dB in the case of magnetite particles, and not less than 57.0 dB, preferably not less than 58.0 dB in the case of maghemite particles).

The present invention is explained in more detail in the following Examples; however, it should be recognized that the scope of the present invention is not restricted to these Examples. Examples The major axial diameter and the axial ratio (major axial diameter/minor axial diameter) in each of the following examples and comparative examples were expressed by the average values of the values obtained by measuring them in the electron microphotographs.

The print-through characteristic was expressed by the correction value $Q_1$ of print-through characteristic at a major axial diameter of 0.2 μm obtained by inserting the measured value of print-through characteristic and the major axial diameter into the following formula (1) which is obtained from the straight line A in FIG. 1:

$$Q_1 = 40 \times (0.2 - A) + B \tag{1}$$

The print-through characteristic of the spindle-shaped magnetite particles or maghemite particles with the surfaces thereof modified by Co in the present invention was expressed by the correction value $Q_3$ of print-through characteristic at a coercive force of 700 Oe and a major axial diameter of 0.2 μm by inserting the measured values of print-through characteristic and coercive force into the following formula (2) so as to obtain the correction value $Q_2$ at a coercive force of 700

Oe, and inserting the thus-obtained correction value $Q_2$ and the major axial diameter into the following formula (3) which is obtained from the straight lines A in FIGS. 4(a), 4(b), 5(a) and 5(b) showing the relationship between the correction value of print-through characteristic $Q_2$ and the major axial diameter.

$$Q_2 = (700 - C) \times 0.02 + B \quad (2)$$

$$Q_3 = 40 \times (0.2 - A) + Q_2 \quad (3)$$

In the formulae (1) to (3), $Q_1$ represents the correction value (dB) of print-through characteristic at a major axial diameter of 0.2 μm, $Q_2$ the correction value (dB) of print-through characteristic at a coercive force of 700 Oe, $Q_3$ the correction value (dB) of print-through characteristic at a coercive force of 700 Oe and a major axial diameter of 0.2 μm, A a major axial diameter (μm), B the measured value of print-through characteristic and C the measured value of a coercive force.

The print-through characteristic was measured in accordance with the method described in JOURNAL OF THE JAPAN SOCIETY OF POWDER AND POWDER METALLURGY (1979) (published by Funtai Fummatsu Yakin Kyokai Corporation) Vol. 26, No. 4, page 149 and REPORT OF TECHNICAL RESEARCHES OF DENSHI TSUSHIN GAKKAI (published by Denshi Tsushin Gakkai Corporation) MR77-27, page 2. The magnetic iron oxide particles charged into a cylindrical container 6 mm in diameter and 5 mm in height were retained in a magnetic field of 50 Oe at 60° C. for 80 minutes for magnetization. After the magnetic iron oxide particles were cooled to room temperature, the residual magnetization (Irp) was measured. A DC magnetic field was then applied to the sample, and the saturated residual magnetization (Irs) was obtained. The print-through characteristic was calculated from the following formula as the measured value:

- Measured value of Print-through characteristic P. T. (dB) = −20 log Irp/Irs.

Production of Spindle-Shaped Goethite Particles

Examples 1 to 8, Comparative Examples 1 to 6

Example 1

Into a reaction vessel which was maintained in a non-oxidizing atmosphere by blowing $N_2$ gas thereinto at a rate of 3.4 cm /second, 704 l of an aqueous solution of 1.16 mol/l of $Na_2CO_3$ was charged. The solution was mixed with 296 l of an aqueous ferrous sulfate solution containing 1.35 mol/l of $Fe^{2+}$ (the content of $Na_2CO_3$ corresponds to 2.0 times equivalent based on Fe) to produce $FeCO_3$ at 47° C.

The suspension containing $FeCO_3$ was maintained at 47° C. for 70 minutes while continuously blowing $N_2$ gas thereinto at a rate of 3.4 cm /second. Thereafter, air was blown into the suspension containing $FeCO_3$ at a rate of 2.8 cm /second at 47° C. for 5 hours, thereby obtaining yellowish brown precipitated particles. The pH of the suspension during the aeration was 8.5 to 9.5.

A part of the suspension containing the yellowish brown precipitated particles was filtered out, washed with water, dried and pulverized by an ordinary method.

Figure 8:
FIGS. 8 to 12 are electron micrographs (x 30000) of the particle structures of the spindle-shaped goethite particles obtained in Example 1, Example 5, Comparative Example 1, Comparative Example 5 and Comparative Example 6, respectively.

The thus-obtained yellowish brown precipitated particles were goethite particles as a result of X-ray flourescent analysis. As is clear from the electron micrograph (x 30000) in FIG. 8, the goethite particles were spindle-shaped particles which had an average major axial diameter of 0.30 μm and an axial ratio (major axial diameter/minor axial diameter) of 12.6, and were substantially free of dendrites.

3000 g of the paste (equivalent to about 1000 g of the spindle-shaped goethite particles) obtained by filtering out the suspension containing the spindle-shaped goethite particles and washing it with water was suspended in 60 l of water. The pH of the suspension was 9.7.

To the suspension, 300 ml (equivalent to 2.0 wt% based on the spindle-shaped goethite particles) of an aqueous solution containing 20 g of sodium hexametaphosphate was added and the mixture was stirred for 30 minutes. 10% acetic acid was added to the mixture so that the pH of the suspension became 5.8. The spindle-shaped goethite particles were filtered out by a filter press and dried to obtain the spindle-shaped goethite particles coated with the P compound.

Examples 2 to 4, Comparative Examples 1 to 5

Spindle-shaped goethite particles coated with a P compound, an Si compound or both compounds thereof were produced in the same way as in Example 1 except that the flow rate of $N_2$ gas, the kind, concentration, amount and mixing ratio of the aqueous alkali carbonate, the kind, concentration and amount of the aqueous $Fe^{2+}$ solution and the temperature in the production of $FeCO_3$; the flow rate of $N_2$ gas, the temperature and the time in the aging process; the temperature, the air flow rate and the reaction time in the oxidation process; and the kind and amount of solution in the coating process were varied.

The main conditions for production and the properties of the goethite particles obtained are shown in Tables 1 and 2.

Any of the spindle-shaped goethite particles obtained in Examples 2 to 4 had a uniform particle size and shape, and were substantially free of dendrites.

In Example 3, Ni-containing goethite particles [the Ni content was 0.49 atomic% (calculated as Ni/Fe)] were produced by adding 0.5 atomic% of $NiSO_4$ (calculated as Ni/Fe) in the production of $FeCO_3$.

Figure 10:

In the spindle-shaped goethite particles obtained in Comparative Example 1, the particle size was non-uniform and aggregates were produced, as shown in the electron micrograph (x 30000) of FIG. 10.

Figure 11:

The electron micrographs (x 30000) of the spindle-shaped goethite particles obtained in Comparative Example 5 are shown in FIGS. 11.

The axial ratios (major axial diameter/minor axial diameter) of the spindle-shaped goethite particles obtained in Comparative Example 5 were small.

Example 5

Into a reaction vessel which was maintained in a non-oxidizing atmosphere by blowing $N_2$ gas thereinto at a rate of 3.4 cm /second, 600 l of an aqueous solution of 1.35 mol/l of $Na_2CO_3$ was charged. The solution was mixed with 300 l of an aqueous ferrous sulfate solution containing 1.35 mol/l of $Fe^{2+}$ (the content of $Na_2CO_3$ corresponds to 2.0 times equivalent based on Fe) to produce $FeCO_3$ at 47° C.

The suspension containing $FeCO_3$ was maintained at 47° C. for 60 minutes while continuously blowing $N_2$ gas thereinto at a rate of 3.4 cm /second, and 5.0 l of an aqueous zinc sulfate solution containing 3.0 atomic% of Zn based on Fe was added. The mixture was held for 10 minutes more. Thereafter, air was passed into the aged suspension containing $FeCO_3$ at a rate of 2.8 cm /second at 47° C. for 6.0 hours, thereby obtaining yellowish brown precipitated particles. The pH of the suspension during the aeration was 8.5 to 9.5.

A part of the suspension containing the yellowish brown precipitated particles was filtered out, washed with water, dried and pulverized by an ordinary method.

Figure 9:

The thus-obtained yellowish brown precipitated particles were goethite particles as a result of X-ray (fluorescent) analysis. As is clear from the electron micrograph (x 30000) in FIG. 9, the goethite particles were spindle-shaped particles which had an average major axial diameter of 0.29 μm and an axial ratio (major axial diameter/minor axial diameter) of 17.0 and were substantially free of dendrites. The zinc content was 3.0 atomic% based on Fe.

3000 g of the paste (equivalent to about 1000 g of the spindle-shaped goethite particles) obtained by filtering out the suspension containing the spindle-shaped goethite particles and washing it with water was suspended in 60 l of water. The pH of the suspension was 9.8. To the suspension, 20 g (equivalent to 2.0 wt% based on the spindle-shaped goethite particles) of sodium silicate (water glass No. 3) was added and the mixture was stirred for 60 minutes. 10% acetic acid was added to the mixture so that the pH of the suspension became 5.8. The spindle-shaped goethite particles were filtered out by a filter press and dried to obtain the spindle-shaped goethite particles coated with the Si compound.

The properties of the spindle-shaped goethite particles obtained are shown in Table 2.

Examples 6 to 8, Comparative Example 6

Spindle-shaped goethite particles were produced in the same way as in Example 5 except that the kind, concentration, and amount of aqueous alkali carbonate, the kind, concentration and amount of the aqueous $Fe^{2+}$ solution and the temperature in the production of $FeCO_3$; the temperature and the time in the aging process; the kind and amount of Zn compound and timing for adding it; the temperature, the air flow rate and the reaction time in the oxidation process; and the kind and amount of solution in the coating process were varied.

The main conditions for production and the properties of the goethite particles obtained are shown in Tables 1 and 2.

As a result of observation through an electron microscope, any of the spindle-shaped goethite particles obtained in Examples 6 to 8 had a uniform particle size and were substantially free of dendrites.

Figure 12:

The electron micrographs (x 30000) of the spindle-shaped goethite particles obtained in Comparative Example 6 are shown in FIG. 12.

The axial ratio (major axial diameter/minor axial diameter) of the spindle-shaped goethite particles obtained in Comparative Example 6 was small.

Production of Spindle-Shaped Hematite Particles

Examples 9 to 16, Comparative Examples 7 to 12

Example 9

800 g of the spindle-shaped goethite particles coated with the P compound which had been obtained in Example 1 were heated to 600° C. in air to obtain spindle-shaped hematite coated with the P compound.

As a result of observation through an electron microscope, the particles had an average major axial diameter of 0.24 μm and an axial ratio (major axial diameter/minor axial diameter) of 11.1.

Examples 10 to 16, Comparative Examples 7 to 12

Spindle-shaped hematite particles were obtained in the same way as in Example 9 except that the kind of the spindle-shaped goethite particles coated with a P compound, an Si compound or both compounds thereof and the heating temperature were varied.

The main conditions for production and the properties of the hematite particles obtained are shown in Table 3.

Production of Spindle-Shaped Magnetite Particles

Examples 17 to 24, Comparative Examples 13 to 18

Example 17

1000 g of the spindle-shaped hematite particles obtained in Example 9 were charged into a 13-l retort reducing vessel, and $H_2$ gas was blown into the particles at a rate of 1.0 l/minute while rotating the vessel to reduce the hematite particles at 300° C. for 3 hours, thereby obtaining spindle-shaped magnetite particles.

Figure 13:
FIGS. 13 and 14 are electron micrographs (x 30000) of the particle structures of the spindle-shaped magnetite particles obtained in Examples 17 and 21, respectively.

The electron micrograph (x 30000) of the spindle-shaped magnetite particles obtained is shown in FIG. 13.

As is clear from the electron micrograph, the spindle-shaped magnetite particles were the spindle-shaped particles having an average major axial diameter of 0.23 μm and an axial ratio (major axial diameter/minor axial diameter) of 10.2, had a uniform particle size, and were substantially free of dendrites. When the magnetic characteristics were measured, the coercive force was 350 Oe, the saturated magnetization was 81.5 emu/g and he correction value of print-through characteristic $Q_1$ was 46.8 dB.

Examples 18 to 24, Comparative Examples 13 to 18

Spindle-shaped magnetite particles were obtained in the same way as in Example 17 except that the kind of the hematite particles and the reducing temperature were varied.

The main conditions for production and the properties of the hematite particles obtained are shown in Table 4.

As a result of observation through an electron microscope, any of the spindle-shaped magnetite particles obtained in Examples 18 to 24 had a uniform particle size and were substantially free of dendrites.

Figure 14:

The electron micrograph (x 30000) of the spindle-shaped magnetite particles obtained in Example 21 is shown in FIG. 14.

Production of Spindle-Shaped Maghemite Particles

Examples 25 to 32, Comparative Examples 19 to 24

Example 25

600 g of the spindle-shaped magnetite particles obtained in Example 17 were oxidized at 270° C. for 30 minutes to obtain spindle-shaped maghemite particles.

As a result of observation through an electron microscope, the spindle-shaped maghemite particles obtained were the spindle-shaped particles having an average major axial diameter of 0.23 μm and an axial ratio (major axial diameter/minor axial diameter) of 10.2, had a uniform particle size, and were substantially free of dendrites. When the magnetic characteristics were measured, the coercive force was 390 Oe, the saturated magnetization was 72.0 emu/g and the correction value of print-through characteristic $Q_1$ was 55.8 dB.

Figure 15:
FIGS. 15 to 17 are electron micrographs (x 30000) of the particle structures of the spindle-shaped maghemite particles obtained in Example 25, Example 29 and Comparative Example 23, respectively.

The electron micrograph (x 30000) of the spindle-shaped maghemite particles obtained in Example 25 is shown in FIG. 15.

Examples 26 to 32, Comparative Examples 19 to 24

Spindle-shaped maghemite particles were obtained in the same way as in Example 25 except that the kind of the spindle-shaped magnetite particles was varied.

The main conditions for production and the properties of the maghemite particles obtained are shown in Table 5.

As a result of observation through an electron microscope, any of the spindle-shaped maghemite particles obtained in Examples 26 to 32 had a uniform particle size and shape, and were substantially free of dendrites.

Figure 16:
Figure 17:

The electron micrographs (x 30000) of the spindle-shaped maghemite particles obtained in Example 29 and Comparative Example 23 are shown in FIGS. 16 and 17, respectively.

Production of Spindle-Shaped Co-Modified Magnetite Particles

Examples 33 to 40, Comparative Examples 25 to 30

Example 33

100 g of spindle-shaped magnetite particles obtained in Example 17 were charged into 1.0 l of water with 0.056 mol of cobalt and 0.113 mol of ferrous iron dissolved therein by using cobalt sulfate and ferrous sulfate while preventing the inclusion of air as much as possible, and dispersed until the dispersion became a fine slurry. Into the dispersion, 163 ml of 18-N aqueous NaOH solution was poured and water was further added so as to form 1.3 l of a dispersion in which the hydroxyl concentration was 2.0 mol/l. The temperature of the dispersion was raised to 100° C. and it was stirred for 10 hours. Thereafter, the slurry was taken out, washed with water, filtered out and dried at 60° C. to obtain spindle-shaped Co-modified magnetite particles.

As a result of observation through an electron microscope, the spindle-shaped magnetite particles had the same configuration and the particle size as the precursor, namely, the spindle-shaped magnetite particles had an average major axial diameter of 0.23 μm and an axial ratio (major axial diameter/minor axial diameter) of 9.2. When the magnetic characteristics were measured, the coercive force was 729 Oe, the saturated magnetization σs was 82.5 emu/g and the corrected value of print-through characteristic $Q_3$ was 55.2 dB. The particles contained 3.82 atomic% of cobalt based on Fe and Co.

Examples 34 to 40, Comparative Examples 25 to 30

Spindle-shaped magnetite particles modified by Co or Co and Fe(II) were obtained in the same way as in Example 33 except that the kind of the precursor, the amounts of Co added, Fe(II) added and NaOH added, the hydroxyl concentration and the temperature were varied under conditions that the amount of precursor spindle-shaped magnetite particles was 100 g and the whole volume of the dispersion was 1.3 l.

The main conditions for production and the properties of the particles obtained are shown in Table 6.

Figure 18:
FIGS. 18 and 19 are electron micrographs (x 30000) of the particles structures of the spindle-shaped Co-modified magnetite particles obtained in Examples 37 and spindle-shaped Co-modified maghemite particles obtained in Example 41, respectively.

The electron micrograph (x 30000) of the spindle-shaped magnetite particles modified by Co and Fe(II) obtained in Example 37 is shown in FIG. 18.

Production of Spindle-Shaped Co-Modified Maghemite Particles

Examples 41 to 48, Comparative Examples 31 to 36

Example 41

100 g of spindle-shaped maghemite particles obtained in Example 25 were charged into 1.0 l of water with 0.048 mol of cobalt and 0.107 mol of ferrous iron dissolved therein by using cobalt sulfate and ferrous sulfate while preventing the inclusion of air as much as possible, and dispersed until the dispersion became a fine slurry. Into the dispersion, 53 ml of 18-N aqueous NaOH solution was poured and water was further added so as to form 1.3 l of dispersion in which the hydroxyl concentration was 0.5 mol/l. The temperature of the dispersion was raised to 100° C. and it was stirred for 10 hours. Thereafter, the slurry was taken out, washed with water, filtered out and dried at 60° C. to obtain spindle-shaped Co-modified maghemite particles.

Figure 19:

As is clear from the electron micrograph (x 30000) shown in FIG. 19, the spindle-shaped maghemite particles had the same configuration and the particle size as the precursor, namely, the spindle-shaped maghemite particles had an average major axial diameter of 0.23 μm and an axial ratio (major axial diameter/minor axial diameter) of 9.1. When the magnetic characteristics were measured, the coercive force was 508 Oe, the saturated magnetization σs was 76.3 emu/g and the correction value of print-through characteristic Q3 was 60.4 dB. The particles contained 3.41 atomic% of cobalt based on Fe and Co.

Examples 42 to 48, comparative Examples 31 to 36

Spindle-shaped maghemite particles modified by Co or Co and Fe(II) were obtained in the same way as in Example 41 except that the kind of the precursor, the amounts of Co added, Fe(II) added and NaOH added, the hydroxyl concentration and the temperature were varied under conditions that the amount of precursor spindle-shaped maghemite particles was 100 g and the whole volume of the dispersion was 1.3 l.

The main conditions for production and the properties of the particles obtained are shown in Table 7.

TABLE 1

| Production of spindle-shaped goethite particles | | | | |
|---|---|---|---|---|
| Production of FeCO₃ | | | | |
| | Alkali carbonate | | | Aging process |
| $N_2$ flow | Mixing ratio (times | Aqueous $Fe^{2+}$ solution | | $N_2$ flow |

TABLE 1-continued

Production of spindle-shaped goethite particles

| | rate (cm/sec) | Kind | Conc. (mol/l) | Amount (l) | equivalent | Kind | Conc (mol/l) | Amount (l) | Temp (°C.) | rate (cm/sec) | Temp (°C.) | Time (min) |
|---|---|---|---|---|---|---|---|---|---|---|---|---|
| Ex. | | | | | | | | | | | | |
| 1 | 3.4 | $Na_2CO_3$ | 1.16 | 704 | 2.0 | $FeSO_4$ | 1.35 | 296 | 47 | 3.4 | 47 | 70 |
| 2 | 2.3 | $K_2CO_3$ | 0.67 | 852 | 2.8 | " | 1.35 | 148 | 42 | 2.3 | 43 | 55 |
| 3 | 3.4 | $Na_2CO_3$ | 1.33 | 704 | 2.3 | " | 1.35 | 296 | 50 | 3.4 | 51 | 80 |
| 4 | 3.4 | " | 1.16 | 704 | 2.0 | " | 1.35 | 296 | 45 | 3.4 | 45 | 80 |
| 5 | 3.4 | " | 1.35 | 600 | 2.0 | " | 1.35 | 300 | 47 | 3.4 | 47 | 70 |
| 6 | 3.4 | $K_2CO_3$ | 1.10 | 600 | 2.0 | $FeCl_2$ | 1.10 | 300 | 45 | 3.4 | 45 | 50 |
| 7 | 3.4 | $Na_2CO_3$ | 1.89 | 600 | 2.8 | $FeSO_4$ | 1.35 | 300 | 50 | 3.4 | 50 | 90 |
| 8 | 3.4 | " | 1.22 | 600 | 1.8 | " | 1.35 | 300 | 47 | 3.4 | 47 | 60 |
| Comp. | | | | | | | | | | | | |
| 1 | 3.4 | $Na_2CO_3$ | 0.71 | 704 | 1.2 | $FeSO_4$ | 1.35 | 296 | 47 | 3.4 | 47 | 70 |
| 2 | 3.4 | " | 1.16 | 704 | 2.0 | " | 1.35 | 296 | 47 | 3.4 | 47 | 30 |
| 3 | 3.4 | " | 1.16 | 704 | 2.0 | " | 1.35 | 296 | 35 | 3.4 | 35 | 70 |
| 4 | 3.4 | " | 1.16 | 704 | 4.0 | " | 1.35 | 296 | 47 | 3.4 | 47 | 70 |
| 5 | — | " | 1.35 | 600 | 2.0 | " | 1.35 | 300 | 50 | — | — | — |
| 6 | — | " | 1.35 | 600 | 2.0 | " | 1.35 | 300 | 50 | — | — | — |

| | Zn compound | | | | | Oxidation process | | |
|---|---|---|---|---|---|---|---|---|
| | Kind | Amount Zn/Fe (at %) | *Timing | pH | Temp (°C.) | Air flow rate (cm/sec) | Reaction time (hour) | |
| Ex. | | | | | | | | |
| 1 | — | — | — | 8.5–9.5 | 47 | 2.8 | 5.0 | |
| 2 | — | — | — | 8.5–10.0 | 43 | 2.3 | 3.5 | |
| 3 | — | — | — | 8.5–9.8 | 55 | 2.8 | 5.2 | |
| 4 | — | — | — | 8.5–9.5 | 45 | 4.5 | 3.5 | |
| 5 | $ZnSO_4$ | 3.0 | D | 8.5–9.5 | 47 | 2.8 | 6.0 | |
| 6 | $ZnCl_2$ | 5.0 | A | 8.5–9.5 | 45 | 2.8 | 5.1 | |
| 7 | $ZnSO_4$ | 1.0 | B | 8.5–9.5 | 50 | 2.8 | 6.1 | |
| 8 | $ZnSO_4$ | 3.0 | C | 8.5–9.5 | 47 | 4.0 | 6.0 | |
| Comp. | | | | | | | | |
| 1 | — | — | — | 8.0–9.0 | 47 | 2.8 | 4.3 | |
| 2 | — | — | — | 8.2–9.2 | 47 | 2.8 | 4.3 | |
| 3 | — | — | — | 8.0–9.2 | 47 | 2.8 | 3.8 | |
| 4 | — | — | — | 8.5–10.3 | 47 | 2.8 | 4.8 | |
| 5 | — | — | — | 8.5–9.5 | 50 | 2.8 | 4.5 | |
| 6 | $ZnSO_4$ | 1.0 | B | 8.5–9.5 | 50 | 2.8 | 4.8 | |

*Timing for addition
A: Add to aqueous alkali carbonate
B: Add to aqueous ferrous salt
C: Add to suspension containing $FeCO_3$
D: Add to suspension containing $FeCO_3$ in the course of aging

TABLE 3

| Kind of goethite particles (Ex. No. and Comp. No.) | | Baking Temp (°C.) | Spindle-shaped hematite particles | |
|---|---|---|---|---|
| | | | Major axial diameter (μm) | Axial ratio (major axial diameter/ minor axial diameter) |
| Ex. | Ex. | | | |
| 9 | 1 | 600 | 0.24 | 11.1 |
| 10 | 2 | 200 | 0.20 | 11.0 |
| 11 | 3 | 600 | 0.30 | 11.0 |
| 12 | 4 | 500 | 0.15 | 10.8 |
| 13 | 5 | 600 | 0.28 | 11.8 |
| 14 | 6 | 600 | 0.25 | 11.2 |
| 15 | 7 | 200 | 0.27 | 10.9 |
| 16 | 8 | 600 | 0.28 | 11.5 |
| Comp. | Comp. | | | |
| 7 | 1 | 600 | 0.33 | 7.5 |
| 8 | 2 | 550 | 0.18 | 6.8 |
| 9 | 3 | 500 | 0.12 | 5.5 |
| 10 | 4 | 500 | 0.17 | 6.4 |
| 11 | 5 | 600 | 0.25 | 5.7 |
| 12 | 6 | 600 | 0.26 | 5.8 |

TABLE 2

| | Spindle-shaped goethite particles | | | Coating process | |
|---|---|---|---|---|---|
| | Zn Content (at %) | Major axial diameter (μm) | Axial ratio (Major axial diameter/ minor axial diameter) | *Kind | Amount (wt %) |
| Ex. | | | | | |
| 1 | — | 0.30 | 12.6 | A | 2.0 |
| 2 | — | 0.25 | 12.3 | A + B | 1.5 + 1.0 |
| 3 | — | 0.38 | 12.5 | B | 2.0 |
| 4 | — | 0.19 | 12.1 | B | 2.0 |
| 5 | 3.0 | 0.29 | 17.0 | B | 2.0 |
| 6 | 5.0 | 0.26 | 16.2 | B | 2.0 |
| 7 | 1.0 | 0.31 | 15.7 | B | 3.0 |
| 8 | 2.9 | 0.29 | 16.5 | B | 3.0 |
| Comp. | | | | | |
| 1 | — | 0.42 | 10.2 | A | 2.0 |
| 2 | — | 0.22 | 9.4 | A + B | 1.5 + 1.0 |
| 3 | — | 0.15 | 7.5 | A + B | 1.5 + 1.0 |
| 4 | — | 0.23 | 8.7 | A + B | 1.5 + 1.0 |
| 5 | — | 0.31 | 7.8 | B | 2.0 |
| 6 | 1.0 | 0.31 | 7.9 | B | 2.0 |

*Kind of coating material
A: Sodium hexametaphosphate
B: Water-glass No. 3

TABLE 4

| Kind of hematite particles (Ex. No. and comp. No.) | Reduction under heating Temp. (°C.) | Reduction under heating Time (Hr) | Spindle-shaped Magnetite particles Shape | Major axial diameter (μm) | Axial ratio (major axial diameter/ minor axial diameter) | Coercive force Hc (Oe) | Saturated magnetization σs (emu/g) | Correction value of print-through characteristic $Q_1$ (dB) |
|---|---|---|---|---|---|---|---|---|
| Ex. | Ex. | | | | | | | |
| 17 | 9 | 300 | 3 | Spindle | 0.23 | 10.2 | 350 | 81.5 | 46.8 |
| 18 | 10 | 300 | 3 | " | 0.19 | 10.0 | 300 | 81.7 | 47.0 |
| 19 | 11 | 350 | 2.5 | " | 0.29 | 10.0 | 395 | 82.3 | 47.4 |
| 20 | 12 | 270 | 3 | " | 0.14 | 9.9 | 295 | 81.9 | 47.5 |
| 21 | 13 | 300 | 3 | " | 0.28 | 11.8 | 345 | 83.1 | 45.8 |
| 22 | 14 | 300 | 3 | " | 0.25 | 11.2 | 295 | 80.9 | 46.0 |
| 23 | 15 | 350 | 2.5 | " | 0.26 | 10.9 | 375 | 81.7 | 47.6 |
| 24 | 16 | 350 | 2.5 | " | 0.27 | 11.5 | 345 | 82.6 | 45.2 |
| Comp. | Comp. | | | | | | | |
| 13 | 7 | 300 | 3 | Spindle | 0.32 | 7.2 | 385 | 81.2 | 40.2 |
| 14 | 8 | 300 | 3 | " | 0.17 | 6.6 | 300 | 82.3 | 43.2 |
| 15 | 9 | 300 | 3 | " | 0.12 | 5.3 | 225 | 81.4 | 43.2 |
| 16 | 10 | 300 | 3 | " | 0.16 | 6.2 | 285 | 79.6 | 42.6 |
| 17 | 11 | 300 | 3 | " | 0.24 | 5.5 | 355 | 81.3 | 42.4 |
| 18 | 12 | 300 | 3 | " | 0.25 | 5.5 | 360 | 81.9 | 41.0 |

TABLE 5

| Kind of magnetite particles (Ex. No. and comp. No.) | Spindle-shaped Maghemite particles Shape | Major axial diameter (μm) | Axial ratio (major axial diameter/ minor axial diameter) | Coercive force Hc (Oe) | Saturated magnetization σs (emu/g) | Correction value of print-through characteristic $Q_1$ (dB) |
|---|---|---|---|---|---|---|
| Ex. | Ex. | | | | | |
| 25 | 17 | Spindle | 0.23 | 10.2 | 390 | 72.0 | 55.8 |
| 26 | 18 | " | 0.19 | 10.0 | 330 | 71.0 | 55.4 |
| 27 | 19 | " | 0.29 | 10.0 | 420 | 71.4 | 55.4 |
| 28 | 20 | " | 0.14 | 9.9 | 310 | 70.5 | 55.5 |
| 29 | 21 | " | 0.28 | 11.8 | 370 | 70.5 | 53.8 |
| 30 | 22 | " | 0.25 | 11.2 | 380 | 69.8 | 53.0 |
| 31 | 23 | " | 0.26 | 10.9 | 400 | 71.2 | 55.6 |
| 32 | 24 | " | 0.27 | 11.5 | 380 | 70.5 | 53.2 |
| Comp. | Comp. | | | | | |
| 19 | 13 | Spindle | 0.32 | 7.2 | 410 | 71.5 | 49.2 |
| 20 | 14 | " | 0.17 | 6.6 | 330 | 71.0 | 50.2 |
| 21 | 15 | " | 0.12 | 5.3 | 250 | 70.8 | 50.3 |
| 22 | 16 | " | 0.16 | 6.2 | 310 | 70.5 | 49.6 |
| 23 | 17 | " | 0.24 | 5.5 | 390 | 71.0 | 50.4 |
| 24 | 18 | " | 0.25 | 5.6 | 400 | 70.6 | 49.0 |

TABLE 6

| Kind of precursor particles (Ex. No. and Comp. No.) | Production of spindle-shaped magnetite particles modified by Co or Co and $Fe^{2+}$ Amount of Co added (mol) | Amount of $Fe^{2+}$ added (mol) | Amount of NaOH added (ml) | OH-group Conc. (mol/l) | Temp. (°C.) | Co/(Fe + Co) (at %) | Spindle-shaped magnetite particles modified by Co or Co and $Fe^{2+}$ Shape | Major axial diameter (μm) | Axial ratio (major axial diameter/ minor axial diameter) | Coercive force Hc (Oe) | Saturated magnetization σs (emu/g) | Correction value of print-through characteristic $Q_3$ (dB) |
|---|---|---|---|---|---|---|---|---|---|---|---|---|
| Ex. | Ex. | | | | | | | | | | | |
| 33 | 17 | 0.056 | 0.113 | 163 | 2.0 | 100 | 3.82 | Spindle | 0.23 | 9.2 | 729 | 82.5 | 55.2 |
| 34 | 18 | 0.025 | 0.090 | 49 | 0.5 | 50 | 1.77 | " | 0.19 | 8.7 | 504 | 81.0 | 54.9 |
| 35 | 19 | 0.085 | — | 226 | 3.0 | 100 | 6.15 | " | 0.29 | 9.4 | 793 | 76.5 | 55.0 |
| 36 | 20 | 0.093 | 0.129 | 241 | 3.0 | 100 | 6.13 | " | 0.14 | 8.3 | 733 | 82.8 | 54.5 |
| 37 | 21 | 0.068 | 0.143 | 240 | 3.0 | 50 | 4.51 | " | 0.28 | 10.6 | 722 | 83.8 | 56.4 |
| 38 | 22 | 0.110 | 0.138 | 244 | 3.0 | 100 | 7.12 | " | 0.25 | 9.9 | 830 | 82.1 | 55.4 |
| 39 | 23 | 0.136 | 0.152 | 104 | 1.0 | 100 | 8.59 | " | 0.26 | 9.6 | 775 | 82.0 | 55.3 |
| 40 | 24 | 0.102 | 0.179 | 392 | 5.0 | 100 | 6.47 | " | 0.27 | 10.1 | 912 | 84.8 | 55.6 |
| Comp. | Comp. | | | | | | | | | | | |
| 25 | 13 | 0.056 | 0.125 | 237 | 3.0 | 100 | 3.79 | Spindle | 0.32 | 6.8 | 812 | 83.2 | 51.8 |
| 26 | 14 | 0.039 | 0.090 | 231 | 3.0 | 75 | 2.74 | " | 0.17 | 5.9 | 640 | 81.6 | 51.3 |
| 27 | 15 | 0.051 | 0.156 | 240 | 3.0 | 100 | 3.39 | " | 0.12 | 4.8 | 675 | 84.3 | 51.2 |
| 28 | 16 | 0.070 | 0.179 | 317 | 4.0 | 100 | 4.53 | " | 0.16 | 5.5 | 765 | 84.9 | 51.0 |
| 29 | 17 | 0.076 | 0.179 | 101 | 1.0 | 100 | 4.90 | " | 0.24 | 5.0 | 697 | 85.3 | 51.7 |

TABLE 6-continued

| Kind of precursor particles (Ex. No. and Comp. No.) | Production of spindle-shaped magnetite particles modified by Co or Co and Fe$^{2+}$ | | | | | Spindle-shaped magnetite particles modified by Co or Co and Fe$^{2+}$ | | | | | |
|---|---|---|---|---|---|---|---|---|---|---|---|
| | Amount of Co added (mol) | Amount of Fe$^{2+}$ added (mol) | Amount of NaOH added (ml) | OH-group Conc. (mol/l) | Temp. (°C.) | Co/(Fe + Co) (at %) | Shape | Major axial diameter (μm) | Axial ratio (major axial diameter/minor axial diameter) | Coercive force Hc (Oe) | Saturated magnetization σs (emu/g) | Correction value of print-through characteristic Q$_3$ (dB) |
| 30 | 18 | 0.059 | 0.098 | 126 | 1.5 | 100 | 4.06 | " | 0.25 | 5.2 | 690 | 81.8 | 51.9 |

TABLE 7

| Kind of precursor particles (Ex. No. and Comp. No.) | Production of spindle-shaped maghemite particles modified by Co or Co and Fe$^{2+}$ | | | | | Spindle-shaped maghemite particles modified by Co or Co and Fe$^{2+}$ | | | | | |
|---|---|---|---|---|---|---|---|---|---|---|---|
| | Amount of Co added (mol) | Amount of Fe$^{2+}$ added (mol) | Amount of NaOH added (ml) | OH-group Conc. (mol/l) | Temp. (°C.) | Co/(Fe + Co) (at %) | Shape | Major axial diameter (μm) | Axial ratio (major axial diameter/minor axial diameter) | Coercive force Hc (Oe) | Saturated magnetization σs (emu/g) | Correction value of print-through characteristic Q$_3$ (dB) |
| Ex. | Ex. | | | | | | | | | | | |
| 41 | 25 | 0.048 | 0.107 | 53 | 0.5 | 100 | 3.41 | Spindle | 0.23 | 9.1 | 508 | 76.3 | 60.4 |
| 42 | 26 | 0.059 | 0.063 | 158 | 2.0 | 100 | 4.29 | " | 0.19 | 9.1 | 603 | 72.9 | 60.3 |
| 43 | 27 | 0.093 | — | 227 | 3.0 | 100 | 6.91 | " | 0.29 | 9.5 | 713 | 69.4 | 60.4 |
| 44 | 28 | 0.085 | 0.125 | 132 | 1.5 | 100 | 5.81 | " | 0.14 | 8.3 | 611 | 75.5 | 60.2 |
| 45 | 29 | 0.076 | 0.161 | 243 | 3.0 | 75 | 5.10 | " | 0.28 | 10.6 | 688 | 78.0 | 60.6 |
| 46 | 30 | 0.170 | 0.072 | 388 | 5.0 | 100 | 11.38 | " | 0.25 | 9.9 | 969 | 70.5 | 60.5 |
| 47 | 31 | 0.085 | 0.143 | 242 | 3.0 | 55 | 5.74 | " | 0.26 | 9.9 | 650 | 76.7 | 60.3 |
| 48 | 32 | 0.102 | 0.054 | 234 | 3.0 | 80 | 7.24 | " | 0.27 | 10.2 | 693 | 71.7 | 61.0 |
| Comp. | Comp. | | | | | | | | | | | |
| 31 | 19 | 0.065 | 0.116 | 92 | 1.0 | 100 | 4.54 | Spindle | 0.32 | 6.8 | 573 | 75.8 | 56.9 |
| 32 | 20 | 0.085 | 0.098 | 237 | 3.0 | 50 | 5.92 | " | 0.17 | 6.0 | 605 | 74.5 | 56.8 |
| 33 | 21 | 0.085 | 0.179 | 174 | 2.0 | 100 | 5.61 | " | 0.12 | 4.7 | 657 | 78.3 | 55.5 |
| 34 | 22 | 0.076 | 0.161 | 243 | 3.0 | 100 | 5.10 | " | 0.16 | 5.6 | 700 | 77.3 | 56.6 |
| 35 | 23 | 0.102 | — | 228 | 3.0 | 100 | 7.53 | " | 0.24 | 5.2 | 725 | 69.2 | 55.6 |
| 36 | 24 | 0.059 | 0.134 | 238 | 3.0 | 70 | 4.08 | " | 0.25 | 5.1 | 623 | 77.0 | 56.2 |

Production of Spindle-Shaped Goethite Particles

Examples 49 to 56, Comparative Examples 37 to 42

Example 49

Into a reaction vessel which was maintained in a non-oxidizing atmosphere by blowing N$_2$ gas thereinto at a rate of 3.4 cm /second, 580 l of an aqueous solution of 1.32 mol/l of Na$_2$CO$_3$ and 20.0 l of an aqueous solution of 13.5 mol/l of NaOH (which corresponds to 17.6% based on Na$_2$CO$_3$) were added. The solution was mixed with 400 l of an aqueous ferrous sulfate solution containing 1.5 mol/l of Fe$^{2+}$ (he total content of Na$_2$CO$_3$ and NaOH corresponds to 1.5 times equivalent based on Fe$^{2+}$, and the concentration of Fe$^{2+}$ is equivalent to 0.60 mol/l) to produce an Fe$-^{2+}$ containing precipitate at 45° C.

The suspension containing the Fe$-^{2+}$ containing precipitate was maintained at 45° C. for 50 minutes while continuously blowing N$_2$ gas thereinto at a rate of 3.4 cm /second. Thereafter, air was blown into the suspension of the Fe$-^{2+}$ containing precipitate at a rate of 4.5 cm /second at 47° C. for 5.5 hours, thereby obtaining yellowish brown precipitated particles. The pH of the suspension during the aeration was 8.5 to 10.0.

A part of the suspension containing the yellowish brown precipitated particles was filtered out, washed with water, dried and pulverized by an ordinary method.

Figure 20:
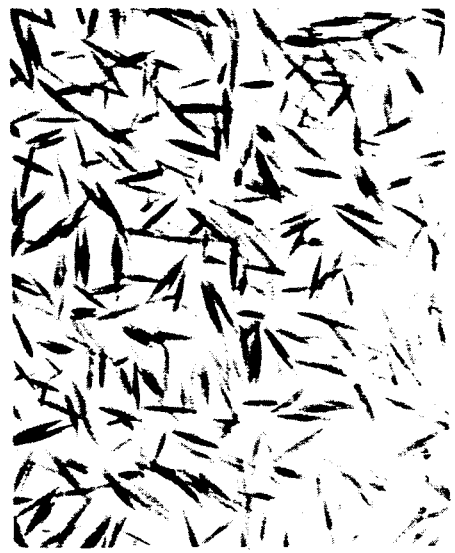
FIGS. 20 and 21 are electron micrographs (x 30000) of the particle structures of the spindle-shaped goethite particles obtained in Examples 49 and 52, respectively.

The thus-obtained yellowish brown precipitated particles proved to be goethite particles as a result of X-ray (fluorescent) analysis. As is clear from the electron micrograph (x 30000) in FIG. 20, the goethite particles were spindle-shaped particles which had an average major axial diameter of 0.29 μm and an axial ratio (major axial diameter/minor axial diameter) of 12.0, and were substantially free of dendrites.

3000 g of the paste (equivalent to about 1000 g of the spindle-shaped goethite particles) obtained by filtering out the suspension containing the spindle-shaped goethite particles and washing it with water was suspended in 60 l of water. The pH of the suspension was 9.7.

To the suspension, 300 ml (equivalent to 1.5 wt% based on the spindle-shaped goethite particles) of an aqueous solution containing 15 g of sodium hexametaphosphate was added and the mixture was stirred for 30 minutes. After adding 10 g of sodium silicate (water glass No. 3) (equivalent to about 1.0 wt% based on the spindle-shaped goethite particles) and stirring the resultant mixture for 60 minutes, 10% acetic acid was added to the mixture so that the pH of the suspension became 5.8. The spindle-shaped goethite particles were filtered out by a filter press and dried to obtain the spindle-shaped goethite particles coated with the P compound and the Si compound.

Examples 50 and 51, Comparative Examples 37, 38 and 41

Yellowish brown particles were obtained in the same way as in Example 49 except that the kind, concentration, amount and mixing ratio of aqueous alkali carbonate, the kind, concentration, amount, mixing ratio and timing for addition of the aqueous alkali hydroxide, the kind, concentration, amount and reaction concentration of the aqueous $Fe^{2+}$ solution and the mixing temperature in the production of an $Fe-^{2+}$ containing precipitate or $FeCO_3$; the temperature and the time in the aging process; the temperature, the air flow rate and the reaction time in the oxidation process; and the kind and amount of solution in the coating process were varied.

The main conditions for production and the properties of the goethite particles obtained are shown in Tables 8 and 9.

Any of the spindle-shaped goethite particles obtained in Examples 50 and 51 had a uniform particle size and were substantially free of dendrites.

Figure 22:
FIGS. 22 to 25 are electron micrographs (x 30000) of the particle structures of the mixed particles of the spindle-shaped goethite particles and granular-shaped magnetite particles obtained in Comparative Examples 37 to 40, respectively.
Figure 23:

The particles obtained in Comparative Examples 37 and 38 were spindle-shaped goethite particles including dendrites from the electron micrographs (x 30000) of FIGS. 22 and 23, respectively, and as a result of X-ray (fluorescent) analysis.

Example 52

Into a reaction vessel which was maintained in a non-oxidizing atmosphere by blowing $N_2$ gas thereinto at a rate of 3.4 cm /second, 558 l of an aqueous solution of 0.968 mol/l of Na and 42.0 l of an aqueous solution of 6.5 mol/l of NaOH (which corresponds to 25.3% based on $Na_2CO_3$) were added. The solution was mixed with 300 l of an aqueous ferrous sulfate solution containing 1.5 mol/l of $Fe^{2+}$ (the total content of $Na_2CO_3$ and NaOH corresponds to 1.5 times equivalent based on $Fe^{2+}$, and the concentration of $Fe^{2+}$ is equivalent to 0.50 mol/l) to produce an $Fe-^{2+}$ containing precipitate at 45° C.

The suspension containing the $Fe-^{2+}$ containing precipitate was maintained at 50° C. for 70 minutes while continuously blowing $N_2$ gas thereinto at a rate of 3.4 cm /second. An aqueous zinc sulfate solution was then added to the suspension so that the suspension contained 3.0 atomic% of zinc based on $Fe^{2+}$ and the suspension was held for 10 minutes. After the aging, air was blown into the suspension of the $Fe-^{2+}$ containing precipitate at a rate of 4.0 cm/second at 50° C. for 6.7 hours, thereby obtaining yellowish brown precipitated particles. The pH of the suspension during the aeration was 8.7 to 9.8.

A part of the suspension containing the yellowish brown precipitated particles was filtered out, washed with water, dried and pulverized by an ordinary method.

Figure 21:

The thus-obtained yellowish brown precipitated particles were goethite particles as a result of X-ray (fluorescent) analysis. As is clear from the electron micrograph (x 30000) in FIG. 21, the goethite particles were spindle-shaped particles which had an average major axial diameter of 0.29 μm and an axial ratio (major axial diameter/minor axial diameter) of 17.6, and were substantially free of dendrites. The zinc content was 3.0 atomic % of zinc based on Fe.

3000 g of the paste (equivalent to about 1000 g of the spindle-shaped goethite particles) obtained by filtering out the suspension containing the spindle-shaped goethite particles and washing it with water was suspended in 60 l of water. The pH of the suspension was 9.8.

After adding 20 g of sodium silicate (water glass No. 3) (equivalent to about 2.0 wt% based on the spindle-shaped goethite particles) to the suspension and stirring the resultant mixture for 60 minutes, 10% acetic acid was added to the mixture so that the pH of the suspension became 5.8. The spindle-shaped goethite particles were filtered out by a filter press and dried to obtain the spindle-shaped goethite particles coated with the Si compound.

Examples 53 to 56, Comparative Examples 39, 40 and 42

Yellowish brown particles were obtained in the same way as in Example 52 except that the kind, concentration, amount and mixing ratio of the aqueous alkali carbonate, the kind, concentration, amount, mixing ratio and timing for addition of the aqueous alkali hydroxide, the kind, concentration, amount and reaction concentration of the aqueous $Fe^{2+}$ solution, and the mixing temperature in the production of an $Fe-^{2+}$ containing precipitate or $FeCO_3$; the temperature and the time in the aging process; the kind, amount and timing for adding a zinc compound, if any; the temperature, the air flow rate and the reaction time in the oxidation process; and the kind and amount of solution in the coating process were varied.

The main conditions for production and the properties of the goethite particles obtained are shown in Tables 8 and 9.

Any of the spindle-shaped goethite particles obtained in Examples 53 to 56 had a uniform particle size and were substantially free of dendrites.

Figure 24:
Figure 25:

The particles obtained in Comparative Examples 39 and 40 were spindle-shaped goethite particles including dendrites from the electron micrographs (x 30000) of FIGS. 24 and 25, respectively, and as a result of X-ray (fluorescent) analysis.

Production of Spindle-Shaped Hematite Particles Coated with Sintering Inhibitor

Examples 57 to 64, Comparative Examples 43 and 44

Example 57

800 g of the spindle-shaped goethite particles coated with the P compound and the Si compound obtained in Example 49 were heated to 600° C. in air to obtain spindle-shaped hematite coated with the P compound and the Si compound.

As a result of observation through an electron microscope, the particles had an average major axial diameter of 0.22 μm and an axial ratio (major axial diameter/minor axial diameter) of 8.4.

Examples 58 to 64, Comparative Examples 43 and 44

Spindle-shaped hematite particles were obtained in the same way as in Example 57 except that the kind of the spindle-shaped goethite particles and the heating temperature were varied.

The main conditions for production and the properties of the hematite particles obtained are shown in Table 10.

Production of Spindle-Shaped Magnetite Particles

Examples 65 to 72, Comparative Examples 45 to 46

Example 65

600 g of the spindle-shaped hematite particles obtained in Example 57 were charged into a 1.0 l retort reducing vessel, and $H_2$ gas was blown into the particles at a rate of 0.2 l/minute while rotating the vessel to reduce the hematite particles at 330° C. for 3 hours, thereby obtaining spindle-shaped magnetite particles.

Figure 26:
FIGS. 26 and 27 are electron micrographs (x 30000) of the particle structures of the spindle-shaped magnetite particles obtained in Examples 65 and 68, respectively.

The electron microphotograph (x 30000) of the spindle-shaped magnetite particles obtained is shown in FIG. 26.

As is clear from the electron microphotograph, the spindle-shaped magnetite particles were the spindle-shaped particles having an average major axial diameter of 0.20 μm, an axial ratio (major axial diameter/minor axial diameter) of 7.2 and a uniform particle size, and were substantially free of dendrites. When the magnetic characteristics were measured, the coercive force was 365 Oe, the saturated magnetization σs was 80.6 emu/g and the correction value of print-through characteristic $Q_1$ was 45.8 dB.

Examples 66 to 72, Comparative Examples 45 and 46

Spindle-shaped magnetite particles were obtained in the same way as in Example 65 except that the kind of the hematite particles and the reducing temperature were varied.

The main conditions for production and the properties of the hematite particles obtained are shown in Table 11.

Figure 27:

The electron micrograph (x 30000) of the spindle-shaped magnetite particles obtained in Example 68 is shown in FIG. 27.

Production of Spindle-Shaped Maghemite Particles

Examples 73 to 80, Comparative Examples 47 and 48

Example 73

600 g of the spindle-shaped magnetite particles obtained in Example 65 were oxidized at 270° C. for 30 minutes to obtain spindle-shaped maghemite particles.

Figure 28:
FIGS. 28 and 29 are electron micrographs (x 30000) of the particle structures of the spindle-shaped maghemite particles obtained in Example 73 and Example 76, respectively.

As is clear from the electron micrograph (x 30000) shown in FIG. 28, the spindle-shaped maghemite particles obtained were the spindle-shaped particles having an average major axial diameter of 0.20 μm and an axial ratio (major axial diameter/minor axial diameter) of 7.1 and a uniform particle size, and were substantially free of dendrites. When the magnetic characteristics were measured, the coercive force was 400 Oe, the saturated magnetization σs was 70.5 emu/g and the correction value of print-through characteristic $Q_1$ was 54.0 dB.

Examples 74 to 80, Comparative Examples 47 and 48

Spindle-shaped maghemite particles were obtained in the same way as in Example 73 except that the kind of the magnetite particles was varied.

The main conditions for production and the properties of the maghemite particles obtained are shown in Table 12.

Figure 29:

The electron micrographs (x 30000) of the spindle-shaped maghemite particles obtained in Example 76 is shown in FIG. 29.

Production of Spindle-Shaped Co-Modified Magnetite Particles

Examples 81 to 88, Comparative Examples 49 and 50

Example 81

100 g of spindle-shaped magnetite particles obtained in Example 65 were charged into 1.0 l of water with 0.085 mol of cobalt dissolved therein b using cobalt sulfate while preventing the inclusion of air as much as possible, and dispersed until the dispersion became a fine slurry. Into the dispersion, 226 ml of 18-N aqueous NaOH solution was poured and water was further added so as to form 1.3 l of a dispersion in which the hydroxyl concentration was 3.0 mol/l. The temperature of the dispersion was raised to 100° C. and it was stirred for 10 hours.

Thereafter, the slurry was taken out, washed with water, filtered out and dried at 60° C. to obtain spindle-shaped Co-modified magnetite particles.

As a result of observation through an electron microscope, the spindle-shaped Co-modified magnetite particles had the same configuration and the particle size as the precursor, namely, the spindle-shaped magnetite particles had an average major axial diameter of 0.20 μm and an axial ratio (major axial diameter/minor axial diameter) of 6.9. When the magnetic characteristics were measured, the coercive force was 760 Oe, the saturated magnetization σs was 77.0 emu/g and the correction value of print-through characteristic $Q_3$ was 53.9 dB. The particles contained 6.15 atomic % of cobalt based on Fe and Co.

Examples 82 to 88, Comparative Examples 49 and 50

Spindle-shaped magnetite particles modified by Co or Co and Fe(II) were obtained in the same way as in Example 81 except that the kind of the precursor, the amounts of Co added, Fe(II) added and NaOH added, the hydroxyl concentration and the temperature were varied under conditions that the amount of precursor spindle-shaped magnetite particles was 100 g and the whole volume of the dispersion was 1.3 l.

The main conditions for production and the properties of the particles obtained are shown in Table 13.

Figure 30:
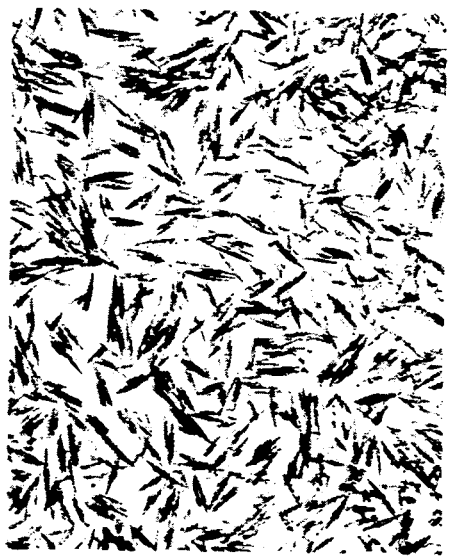
FIGS. 30 and 31 are electron micrographs (x 30000) of the particle structures of the spindle-shaped Co-modified magnetite particles obtained in Examples 84 and the spindle-shaped Co-modified maghemite particles obtained in Example 89, respectively.

The electron micrograph (x 30000) of the spindle-shaped magnetite particles modified by Co and Fe(II) obtained in Example 84 is shown in FIG. 30.

Production of Spindle-Shaped Co-Modified Maghemite Particles

Examples 89 to 96, Comparative Examples 51 and 52

Example 89

100 g of spindle-shaped maghemite particles obtained in Example 73 were charged into 1.0 l of water with 0.153 mol of cobalt dissolved therein by using cobalt sulfate while preventing the inclusion of air as much as possible, and dispersed until the dispersion became a fine slurry. Into the dispersion, 378 ml of 18-N aqueous NaOH solution was poured and water was further added so as to form 1.3 l of a dispersion in which the hydroxyl concentration was 5.0 mol/l. The temperature of the dispersion was raised to 100° C. and it was stirred for 10 hours. Thereafter, the slurry was taken out, washed with water, filtered out and dried at 60° C. to obtain spindle-shaped Co-modified maghemite particles.

Figure 31:

As is clear from the electron micrograph (x 30000) shown in FIG. 31, the spindle-shaped Co-modified maghemite particles had the same configuration and the particle size as the precursor, namely, the spindle-shaped maghemite particles and had an average major axial diameter of 0.20 μm and an axial ratio (major axial diameter/minor axial diameter) of 6.5. When the magnetic characteristics were measured, the coercive force was 912 Oe, the saturated magnetization σs was 67.9 emu/g and the correction value of print-through characteristic $Q_3$ was 59.5 dB. The particles contained 10.88 at% of cobalt based on Fe and Co.

Examples 90 to 96, Comparative Examples 51 and 52

Spindle-shaped maghemite particles modified by Co or Co and Fe(II) were obtained in the same way as in Example 89 except that the kind of the precursor, the amounts of Co added, Fe(II) added and NaOH added, the hydroxyl concentration and the temperature were varied under conditions that the amount of precursor spindle-shaped magnetite particles was 100 g and the whole volume of the dispersion was 1.3 l.

The main conditions for production and the properties of the particles obtained are shown in Table 14.

TABLE 8

Production of $Fe^{2+}$ containing precipitate of $FeCO_3$

| | N2 flow rate (cm/sec) | Alkali carbonate | | | Alkali hydroxide | | | Mixing ratio (%) | Timing (*1) | Total amount of alkali (times equivalent) |
|---|---|---|---|---|---|---|---|---|---|---|
| | | Kind | Conc. (mol/l) | Amount (l) | Kind | Conc. (mol/l) | Amount (l) | | | |
| Ex. | | | | | | | | | | |
| 49 | 3.4 | $Na_2CO_3$ | 1.32 | 580 | NaOH | 13.5 | 20 | 17.6 | 1 | 1.5 |
| 50 | 3.4 | " | 0.94 | 763 | " | 16.8 | 15 | 17.6 | 2 | 2.1 |
| 51 | 3.4 | $K_2CO_3$ | 2.15 | 430 | KOH | 14.9 | 37 | 29.9 | 1 | 1.5 |
| 52 | 3.4 | $Na_2CO_3$ | 0.968 | 558 | NaOH | 6.5 | 42 | 25.3 | 1 | 1.5 |
| 53 | 3.4 | $K_2CO_3$ | 0.669 | 551 | KOH | 6.5 | 49 | 43.2 | 2 | 1.3 |
| 54 | 3.4 | $Na_2CO_3$ | 1.32 | 490 | NaOH | 6.5 | 50 | 25.1 | 1 | 1.5 |
| 55 | 3.4 | " | 1.65 | 545 | " | 6.5 | 55 | 19.9 | 1 | 2.4 |
| 56 | 3.4 | " | 2.51 | 387 | " | 6.5 | 33 | 11.0 | 1 | 1.5 |
| Comp. | | | | | | | | | | |
| 37 | 3.4 | $Na_2CO_3$ | 1.00 | 540 | NaOH | 12.0 | 60 | 66.7 | 1 | 1.5 |
| 38 | 3.4 | " | 0.91 | 586 | " | 13.5 | 14 | 17.6 | 1 | 1.05 |
| 39 | 3.4 | " | 1.00 | 540 | " | 12.0 | 60 | 66.7 | 1 | 1.5 |
| 40 | 3.4 | " | 0.91 | 586 | " | 13.5 | 14 | 17.6 | 1 | 1.05 |
| 41 | — | " | 1.35 | 600 | — | — | — | — | — | 2.0 |
| 42 | 3.4 | " | 1.32 | 490 | NaOH | 6.5 | 50 | 25.1 | 1 | 1.5 |

| | Ferrous salt | | | $Fe^{2+}$ reaction conc. (mol/l) | Mixing temp (°C.) | Zinc compound | | |
|---|---|---|---|---|---|---|---|---|
| | Kind | Conc. (mol/l) | Amount (l) | | | Kind | Amount Zn/Fe (at %) | Timing (*2) |
| Ex. | | | | | | | | |
| 49 | $FeSO_4$ | 1.50 | 400 | 0.60 | 45 | — | — | — |
| 50 | " | 1.80 | 222 | 0.40 | 35 | — | — | — |
| 51 | " | 1.50 | 533 | 0.80 | 35 | — | — | — |
| 52 | " | 1.50 | 300 | 0.50 | 50 | $ZnSO_4$ | 3.0 | D |
| 53 | $FeCl_2$ | 1.35 | 300 | 0.45 | 52 | $ZnCl_2$ | 1.0 | B |
| 54 | $FeSO_4$ | 1.50 | 360 | 0.60 | 47 | $ZnSO_4$ | 3.0 | A |
| 55 | " | 1.50 | 300 | 0.50 | 50 | " | 5.0 | C |
| 56 | " | 1.50 | 480 | 0.80 | 47 | " | 3.0 | B |
| Comp. | | | | | | | | |
| 37 | $FeSO_4$ | 1.50 | 400 | 0.60 | 45 | — | — | — |
| 38 | " | 1.50 | 400 | 0.60 | 45 | — | — | — |
| 39 | " | 1.50 | 400 | 0.60 | 45 | $ZnSO_4$ | 2.0 | C |
| 40 | " | 1.50 | 400 | 0.60 | 45 | " | 1.0 | C |
| 41 | " | 1.35 | 300 | 0.45 | 50 | — | — | — |
| 42 | " | 1.50 | 360 | 0.60 | 47 | $ZnSO_4$ | 3.0 | A |

(Note)
*1: Timing for addition
1: Add to aqueous alkali solution
2: Add to suspension containing $FeCO_3$
*2: Timing for addition
A: Add to aqueous alkali carbonate
B: Add to aqueous ferrous salt
C: Add to suspension containing $FeCO_3$
D: Add to suspension containing $FeCO_3$ in the course of aging

TABLE 9

| | Oxidation process | | | | | | Spindle-shaped goethite particles | | | Coating process | |
|---|---|---|---|---|---|---|---|---|---|---|---|
| | Aging | | | | | | | Major axial | Axial ratio | | |
| | N2 flow rate (cm/sec) | Temp. (°C.) | Time (min) | pH | Temp. (°C.) | Air flow rate (cm/sec) | Reaction time (hour) | Zn content (at %) | diameter (μm) | (major axial diameter/minor axial diameter) | Kind* | Amount (wt %) |
| Ex. | | | | | | | | | | | | |
| 49 | 3.4 | 45 | 50 | 8.5–10.0 | 47 | 4.5 | 5.5 | — | 0.29 | 12.0 | A + B | 1.5 + 1.0 |
| 50 | 3.4 | 35 | 20 | 9.0–10.5 | 38 | 4.5 | 4.0 | — | 0.17 | 11.5 | A | 2.0 |
| 51 | 3.4 | 40 | 60 | 8.8–10.5 | 45 | 3.4 | 8.0 | — | 0.42 | 13.0 | B | 2.0 |
| 52 | 3.4 | 50 | 80 | 8.7–9.8 | 50 | 4.0 | 6.7 | 3.0 | 0.29 | 17.6 | B | 2.0 |
| 53 | 3.4 | 52 | 60 | 8.5–9.7 | 52 | 3.4 | 5.0 | 1.0 | 0.32 | 16.1 | B | 2.0 |
| 54 | 3.4 | 47 | 80 | 8.7–10.0 | 47 | 4.5 | 7.1 | 3.0 | 0.29 | 16.8 | B | 3.0 |
| 55 | 3.4 | 50 | 80 | 8.7–9.8 | 50 | 4.0 | 6.7 | 5.0 | 0.28 | 16.7 | B | 3.0 |
| 56 | 3.4 | 47 | 60 | 8.7–10.0 | 47 | 4.5 | 8.4 | 3.0 | 0.41 | 18.9 | B | 2.0 |

TABLE 9-continued

| | Oxidation process | | | | | | | Spindle-shaped goethite particles | | | Coating process | |
|---|---|---|---|---|---|---|---|---|---|---|---|---|
| | Aging | | | | | | | | Major | Axial ratio | | |
| | $N_2$ flow | | | | | Air flow | Reaction | Zn | axial | (major axial | | Amount |
| | rate | Temp. | Time | | Temp. | rate | time | content | diameter | diameter/minor | | |
| | (cm/sec) | (°C.) | (min) | pH | (°C.) | (cm/sec) | (hour) | (at %) | (μm) | axial diameter) | Kind* | (wt %) |
| Comp. | | | | | | | | | | | | |
| 37 | 3.4 | 45 | 50 | 9.5–12.0 | 47 | 4.5 | 7.0 | — | — | — | — | — |
| 38 | 3.4 | 45 | 50 | 7.8–9.3 | 47 | 4.5 | 4.5 | — | — | — | — | — |
| 39 | 3.4 | 45 | 50 | 9.5–11.9 | 47 | 4.5 | 7.1 | 2.0 | — | — | — | — |
| 40 | 3.4 | 45 | 50 | 7.8–9.3 | 47 | 4.5 | 4.6 | 1.0 | — | — | — | — |
| 41 | — | — | — | 8.5–9.5 | 50 | 2.8 | 4.5 | — | 0.31 | 7.8 | B | 2.0 |
| 42 | — | — | — | 8.7–10.0 | 47 | 4.5 | 7.1 | 3.0 | 0.30 | 7.9 | B | 2.0 |

(Note)
*Kind of coating material
A: Sodium hexametaphosphate
B: Water glass No. 3

TABLE 10

| Kind of goethite particles (Ex. No. and Comp. No.) | Baking Temp (°C.) | Spindle-shaped hematite particles | |
|---|---|---|---|
| | | Major axial diameter (μm) | Axial ratio (major axial diameter/ minor axial diameter) |
| Ex. | Ex. | | |
| 57 | 49 | 600 | 0.22 | 8.4 |
| 58 | 50 | 550 | 0.13 | 8.1 |
| 59 | 51 | 650 | 0.31 | 9.1 |
| 60 | 52 | 600 | 0.25 | 13.0 |
| 61 | 53 | 600 | 0.27 | 11.8 |
| 62 | 54 | 600 | 0.24 | 12.0 |
| 63 | 55 | 200 | 0.23 | 11.8 |
| 64 | 56 | 650 | 0.35 | 13.5 |
| Comp. | Comp. | | | |
| 43 | 41 | 600 | 0.23 | 5.6 |
| 44 | 42 | 600 | 0.22 | 5.6 |

TABLE 11

| Kind of hematite particles (Ex. No. and comp. No.) | Reduction under heating | | Spindle-shaped Magnetite particles | | | | | Correction value of print-through characteristic $Q_1$ (dB) |
|---|---|---|---|---|---|---|---|---|
| | Temp (°C.) | Time (Hr) | Shape | Major axial diameter (μm) | Axial ratio (major axial diameter/ minor axial diameter) | Coercive force Hc (Oe) | Saturated magnetization σs (emu/g) | |
| Ex. | Ex. | | | | | | | |
| 65 | 57 | 330 | 3.0 | Spindle | 0.20 | 7.2 | 365 | 80.6 | 45.8 |
| 66 | 58 | 270 | 3.0 | " | 0.12 | 7.0 | 270 | 79.4 | 46.2 |
| 67 | 59 | 350 | 3.0 | " | 0.30 | 7.8 | 440 | 82.0 | 45.5 |
| 68 | 60 | 300 | 3.0 | " | 0.25 | 12.4 | 405 | 80.0 | 45.2 |
| 69 | 61 | 300 | 3.0 | " | 0.26 | 11.2 | 397 | 80.5 | 45.5 |
| 70 | 62 | 300 | 3.0 | " | 0.22 | 11.0 | 263 | 79.5 | 45.7 |
| 71 | 63 | 300 | 3.0 | " | 0.21 | 11.2 | 260 | 78.8 | 46.2 |
| 72 | 64 | 350 | 3.0 | " | 0.30 | 12.5 | 432 | 82.3 | 45.1 |
| Comp. | Comp. | | | | | | | | |
| 45 | 43 | 300 | 3.0 | Spindle | 0.22 | 4.8 | 380 | 81.4 | 42.2 |
| 46 | 44 | 300 | 3.0 | " | 0.21 | 4.9 | 370 | 80.5 | 42.6 |

TABLE 12

| Kind of spindle-shaped magnetite particles (Ex. No. and comp. No.) | Spindle-shaped maghemite particles | | | | | Correction value of print-through characteristic $Q_1$ (dB) |
|---|---|---|---|---|---|---|
| | Shape | Major axial diameter (μm) | Axial ratio (major axial diameter/ minor axial diameter) | Coercive force Hc (Oe) | Saturated magnetization σs (emu/g) | |
| Ex. | Ex. | | | | | | |
| 73 | 65 | Spindle | 0.20 | 7.1 | 400 | 70.5 | 54.0 |
| 74 | 66 | " | 0.11 | 7.0 | 310 | 69.5 | 53.6 |
| 75 | 67 | " | 0.28 | 7.5 | 470 | 71.0 | 54.8 |
| 76 | 68 | " | 0.24 | 12.5 | 450 | 70.0 | 54.4 |
| 77 | 69 | " | 0.24 | 11.5 | 445 | 71.2 | 55.4 |
| 78 | 70 | " | 0.21 | 10.8 | 400 | 70.5 | 53.6 |
| 79 | 71 | " | 0.19 | 11.3 | 400 | 69.3 | 54.4 |
| 80 | 72 | " | 0.30 | 12.0 | 475 | 71.5 | 55.0 |
| Comp. | Comp. | | | | | | |
| 47 | 45 | Spindle | 0.22 | 4.9 | 410 | 71.5 | 51.2 |

TABLE 12-continued

| Kind of spindle-shaped magnetite particles (Ex. No. and comp. No.) | Spindle-shaped maghemite particles | | | | | |
|---|---|---|---|---|---|---|
| | Shape | Major axial diameter (μm) | Axial ratio (major axial diameter/minor axial diameter) | Coercive force Hc (Oe) | Saturated magnetization σs (emu/g) | Correction value of print-through characteristic $Q_1$ (dB) |
| 48 | " | 0.21 | 4.9 | 420 | 70.8 | 49.6 |

TABLE 13

| Kind of precursor particles (Ex. No. and Comp. No.) | Production of spindle-shaped magnetite particles modified by Co or Co and $Fe^{2+}$ | | | | | Spindle-shaped magnetite particles modified by Co or Co and $Fe^{2+}$ | | | | | |
|---|---|---|---|---|---|---|---|---|---|---|---|
| | Amount of Co added (mol) | Amount of $Fe^{2+}$ added (mol) | Amount of NaOH added (ml) | OH-group Conc. (mol/l) | Temp. (°C.) | Co/(Fe + Co) (at %) | Shape | Major axial diameter (μm) | Axial ratio (major axial diameter/minor axial diameter) | Coercive force Hc (Oe) | Saturated magnetization σs (emu/g) | Correction value of print-through characteristic $Q_3$ (dB) |
| Ex. | Ex. | | | | | | | | | | | |
| 81 | 65 | 0.085 | — | 226 | 3.0 | 100 | 6.15 | Spindle | 0.20 | 6.9 | 760 | 77.0 | 53.9 |
| 82 | 66 | 0.051 | 0.090 | 52 | 0.5 | 50 | 3.55 | " | 0.12 | 6.0 | 486 | 80.7 | 53.8 |
| 83 | 67 | 0.153 | 0.138 | 321 | 4.0 | 100 | 9.64 | " | 0.30 | 7.3 | 930 | 81.5 | 54.2 |
| 84 | 68 | 0.090 | 0.138 | 242 | 3.0 | 100 | 5.91 | " | 0.25 | 10.9 | 780 | 82.8 | 56.0 |
| 85 | 69 | 0.056 | 0.138 | 238 | 3.0 | 50 | 3.76 | " | 0.26 | 10.0 | 636 | 82.6 | 55.6 |
| 86 | 70 | 0.102 | 0.179 | 248 | 3.0 | 100 | 6.47 | " | 0.22 | 9.5 | 850 | 83.6 | 54.8 |
| 87 | 71 | 0.078 | 0.063 | 232 | 3.0 | 70 | 5.43 | " | 0.21 | 9.9 | 713 | 78.9 | 55.7 |
| 88 | 72 | 0.110 | 0.107 | 132 | 1.5 | 100 | 7.27 | " | 0.30 | 11.1 | 829 | 81.0 | 55.7 |
| Comp. | Comp. | | | | | | | | | | | |
| 49 | 45 | 0.080 | 0.161 | 243 | 3.0 | 100 | 5.20 | Spindle | 0.22 | 4.5 | 779 | 83.6 | 50.8 |
| 50 | 46 | 0.051 | 0.090 | 160 | 2.0 | 80 | 3.55 | " | 0.21 | 4.7 | 675 | 80.9 | 51.4 |

TABLE 14

| Kind of precursor particles (Ex. No. and Comp. No.) | Production of spindle-shaped maghemite particles modified by Co or Co and $Fe^{2+}$ | | | | | Spindle-shaped maghemite particles modified by Co or Co and $Fe^{2+}$ | | | | | |
|---|---|---|---|---|---|---|---|---|---|---|---|
| | Amount of Co added (mol) | Amount of $Fe^{2+}$ added (mol) | Amount of NaOH added (ml) | OH-group Conc. (mol/l) | Temp. (°C.) | Co/(Fe + Co) (at %) | Shape | Major axial diameter (μm) | Axial ratio (major axial diameter/minor axial diameter) | Coercive force Hc (Oe) | Saturated magnetization σs (emu/g) | Correction value of print-through characteristic $Q_3$ (dB) |
| Ex. | Ex. | | | | | | | | | | | |
| 89 | 73 | 0.153 | — | 378 | 5.0 | 100 | 10.88 | Spindle | 0.20 | 6.5 | 912 | 67.9 | 59.5 |
| 90 | 74 | 0.068 | 0.107 | 236 | 3.0 | 100 | 4.77 | " | 0.11 | 6.1 | 675 | 75.8 | 59.0 |
| 91 | 75 | 0.025 | 0.054 | 67 | 0.5 | 100 | 1.09 | " | 0.28 | 7.2 | 483 | 72.0 | 59.3 |
| 92 | 76 | 0.059 | 0.143 | 167 | 2.0 | 50 | 4.06 | " | 0.24 | 12.0 | 530 | 78.2 | 60.1 |
| 93 | 77 | 0.059 | 0.090 | 161 | 2.0 | 70 | 4.21 | " | 0.24 | 10.8 | 571 | 75.0 | 60.4 |
| 94 | 78 | 0.071 | 0.075 | 233 | 3.0 | 100 | 5.08 | " | 0.21 | 10.0 | 671 | 74.1 | 60.5 |
| 95 | 79 | 0.110 | 0.054 | 235 | 3.0 | 100 | 7.77 | " | 0.19 | 9.6 | 766 | 71.2 | 60.8 |
| 96 | 80 | 0.080 | 0.143 | 169 | 2.0 | 100 | 5.42 | " | 0.30 | 10.7 | 682 | 77.5 | 60.1 |
| Comp. | Comp. | | | | | | | | | | | |
| 51 | 47 | 0.051 | 0.054 | 228 | 3.0 | 80 | 3.76 | Spindle | 0.22 | 4.6 | 615 | 73.5 | 55.7 |
| 52 | 48 | 0.068 | 0.125 | 238 | 3.0 | 100 | 4.71 | " | 0.21 | 4.4 | 684 | 76.0 | 55.4 |

What is claimed is:

1. Magnetic iron oxide particles comprising spindle-shaped magnetite ($FeO_x \cdot Fe_2O_3$, $0 < x \leq 1$) particles having a major axial diameter of 0.1 to 0.3 μm, an axial ratio (major axial diameter/minor axial diameter) of not less than 7, and a print-through characteristic of not less than 45 dB and showing a substantially uniform particle size, said particles produced by a process comprising:
   (a) aging an aqueous solution containing $FeCO_3$ obtained by reacting an aqueous alkali carbonate with an aqueous ferrous salt solution in a non-oxidizing atmosphere at a temperature of 40° to 60° C. for 50 to 100 minutes, the amount of aqueous alkali carbonate being 1.5 to 3.5 times equivalent based on $Fe^{2+}$ in said aqueous ferrous salt solution;
   (b) blowing an oxygen-containing gas into the suspension containing said $FeCo_3$ to oxidize it and produce spindle-shaped goethite particles;
   (c) providing spindle-shaped goethite particles coated with a sintering preventing material; and
   (d) reducing either said spindle-shaped goethite particles coated with the sintering preventing material, or spindle-shaped hematite particles obtained by heating said spindle-shaped goethite particles coated with the sintering preventing material in a reducing gas.

2. The magnetic iron oxide particles of claim 1, wherein the sintering preventing material is selected from the group consisting of Si, Al and P compounds.

3. Magnetic iron oxide particles comprising spindle-shaped magnetite ($FeO_x \cdot Fe_2O_3$, $0 < x \leq 1$) particles containing zinc and having a major axial diameter of 0.1 to 0.3 μm, an axial ratio (major axial diameter/minor axial diameter) of not less than 8, and a print-through characteristic of not less than 45 dB and showing a substantially uniform particle size, said particles produced by a process comprising:

(a) aging an aqueous solution containing $FeCO_3$ obtained by reacting an aqueous alkali carbonate with an aqueous ferrous salt solution in a non-oxidizing atmosphere at a temperature of 40° to 60° C. for 50 to 100 minutes, the amount of aqueous alkali carbonate being 1.5 to 3.5 times equivalent based on $Fe^{2+}$ in said aqueous ferrous salt solution,
wherein a zinc compound is added to a solution of said aqueous alkali carbonate, said aqueous ferrous salt solution, or said suspension containing $FeCO_3$ in the course of aging prior to oxidation;

(b) blowing an oxygen-containing gas into the suspension containing said $FeCO_3$ to oxidize it and produce spindle-shaped goethite particles;

(c) providing spindle-shaped goethite particles coated with a sintering preventing material; and (d) reducing either said spindle-shaped goethite particles coated with the sintering preventing material, or spindle-shaped hematite particles obtained by heating said spindle-shaped goethite particles coated with the sintering preventing material in a reducing gas.

4. The magnetic iron oxide particles of claim 3, wherein the sintering preventing material is selected from the group consisting of Si, Al and P compounds.

5. Magnetic iron oxide particles comprising spindle-shaped maghemite particles having a major axial diameter of 0.1 to 0.3 μm, an axial ratio (major axial diameter/minor axial diameter) of not less than 7, and a print-through characteristic of not less than 53 dB and showing a substantially uniform particle size, said particles produced by a process comprising:

(a) aging an aqueous solution containing $FeCO_3$ obtained by reacting an aqueous alkali carbonate with an aqueous ferrous salt solution in a non-oxidizing atmosphere at a temperature of 40° to 60° C. for 50 to 100 minutes, the amount of aqueous alkali carbonate being 1.5 to 3.5 times equivalent based on $Fe^{2+}$ in said aqueous ferrous salt solution;

(b) blowing an oxygen-containing gas into the suspension containing said $FeCO_3$ to oxidize it and produce spindle-shaped goethite particles;

(c) providing spindle-shaped goethite particles coated with a sintering preventing material;

(d) reducing either said spindle-shaped goethite particles coated with the sintering preventing material, or spindle-shaped hematite particles obtained by heating said spindle-shaped goethite particles coated with the sintering preventing material in a reducing gas; and (e) oxidizing the thus obtained spindle-shaped magnetite particles to produce maghemite particles.

6. The magnetic iron oxide particles of claim 5, wherein the sintering preventing material is selected from the group consisting of Si, Al and P compounds.

7. Magnetic iron oxide particles comprising spindle-shaped maghemite particles containing zinc and having a major axial diameter of 0.1 to 0.3 μm, an axial ratio (major axial diameter/minor axial diameter) of not less than 8, and a print-through characteristic of not less than 53 dB and showing a substantially uniform particle size, said particles produced by a processing comprising:

(a) aging an aqueous solution containing $FeCO_3$ obtained by reacting an aqueous alkali carbonate with an aqueous ferrous salt solution in a non-oxidizing atmosphere at a temperature of 40° to 60° C. for 50 to 100 minutes, the amount of aqueous alkali carbonate being 1.5 to 3.5 times equivalent based on $Fe^{2+}$ in said aqueous ferrous salt solution,
wherein a zinc compound is added to a solution of said aqueous alkali carbonate, said aqueous ferrous salt solution, or said suspension containing $FeCO_3$ in the course of aging prior to oxidation;

(b) blowing an oxygen-containing gas into the suspension containing said $FeCO_3$ to oxidize it and produce spindle-shaped goethite particles;

(c) providing spindle-shaped goethite particles coated with a sintering preventing material;

(d) reducing either said spindle-shaped goethite particles coated with the sintering preventing material, or spindle-shaped hematite particles obtained by heating said spindle-shaped goethite particles coated with the sintering preventing material in a reducing gas; and (e) oxidizing the thus obtained spindle-shaped magnetite particles containing zinc to produce maghemite particles containing zinc.

8. The magnetic iron oxide particles of claim 7, wherein the sintering preventing material is selected from the group consisting of Si, Al and P compounds.

* * * * *

UNITED STATES PATENT AND TRADEMARK OFFICE
CERTIFICATE OF CORRECTION

PATENT NO. : 5,314,750
DATED : May 24, 1994
INVENTOR(S) : TAKEDOI et al

It is certified that error appears in the above-identified patent and that said letters patent is hereby corrected as shown below:

Title Page, Item [30] last entry should read as follows:

Feb. 27, 1989 [JP]  Japan......................1-48029

Signed and Sealed this

Twentieth Day of September, 1994

BRUCE LEHMAN

Attest:

Attesting Officer

Commissioner of Patents and Trademarks